(12) United States Patent
Suzuki

(10) Patent No.: US 7,384,156 B2
(45) Date of Patent: Jun. 10, 2008

(54) PROJECTION DISPLAY DEVICE, IMAGE PROJECTION SYSTEM, AND LIGHT SOURCE DEVICE

(75) Inventor: Ryuji Suzuki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 11/086,857

(22) Filed: Mar. 22, 2005

(65) Prior Publication Data

US 2005/0213050 A1 Sep. 29, 2005

(30) Foreign Application Priority Data

Mar. 29, 2004 (JP) ............... 2004-095827
Mar. 29, 2004 (JP) ............... 2004-095828

(51) Int. Cl.
*G03B 21/18* (2006.01)
(52) U.S. Cl. .......................... 353/61; 353/60
(58) Field of Classification Search .............. 353/57, 353/58, 60, 6, 61
See application file for complete search history.

(56) References Cited

U.S. PATENT DOCUMENTS

| | | | |
|---|---|---|---|
| 6,443,575 B1 * | 9/2002 | Miyamoto et al. ............. | 353/58 |
| 6,481,854 B1 * | 11/2002 | Sugawara et al. ............. | 353/52 |
| 6,554,432 B2 * | 4/2003 | Ohfune et al. ................ | 353/57 |
| 6,558,003 B2 | 5/2003 | Mihara | |
| 6,733,157 B1 * | 5/2004 | Shyu et al. .................. | 362/294 |
| 7,147,349 B2 * | 12/2006 | Kato et al. ................... | 362/294 |
| 2002/0008852 A1 | 1/2002 | Onishi et al. | |
| 2002/0080334 A1 | 6/2002 | Suzuki et al. | |
| 2002/0109994 A1 | 8/2002 | Liang et al. | |
| 2003/0095349 A1 | 5/2003 | Inamoto ..................... | 359/889 |
| 2003/0137640 A1 * | 7/2003 | Nakano et al. ............... | 353/57 |
| 2003/0197934 A1 | 10/2003 | Ogawa et al. | |

FOREIGN PATENT DOCUMENTS

| | | |
|---|---|---|
| JP | 2000-221599 | 8/2000 |
| JP | 2002-204410 | 7/2002 |
| JP | 2002-244210 | 8/2002 |
| JP | 2003-029342 | 1/2003 |
| JP | 2003-131166 | 5/2003 |
| JP | 2003-217331 | 7/2003 |
| JP | 2003-280101 | 10/2003 |
| JP | 2004061569 | 2/2004 |
| KR | 2003-0019625 | 3/2003 |
| KR | 20-00339542 | 1/2004 |

OTHER PUBLICATIONS

European Search Report dated Aug. 4, 2005.
English translation of Abstract of WO02097529.
EP Communication for Application No. 05251453.6-2209 dated Feb. 27, 2008.

* cited by examiner

*Primary Examiner*—William C. Dowling
(74) *Attorney, Agent, or Firm*—Morgan & Finnegan, L.L.P.

(57) ABSTRACT

Disclosed is a projection display device which projects an image onto a projection surface by a projection optical system by using light from a light source and which helps to realize efficient light source cooling. The projection display device includes: a cooling fan arranged between the projection optical system and the light source and adapted to supply cooling air from the projection optical system to the light source; and an exterior case having an exhaust port in the vicinity of the light source and covering the projection optical system, the cooling fan, and the light source, the projection optical system, the cooling fan, the light source, and the exhaust port being arranged substantially in a straight line.

9 Claims, 11 Drawing Sheets

PROJECTION DISPLAY DEVICE, IMAGE PROJECTION SYSTEM, AND LIGHT SOURCE DEVICE

BACKGROUND OF THE INVENTION

1. Field of the Invention

The present invention relates to a projection display device (a projection type image display device, such as a transmission type liquid crystal projector or a reflection type liquid crystal projector) and an image projection system using the same. Further, the present invention relates to a light source for use in a projection display device, and more particularly to the cooling of the light source of a projection display device.

2. Related Background Art

Conventionally, as the light source lamp of a projection type image display device, there has been used a discharge lamp, such as a metal halide lamp, a high pressure mercury lamp, a halogen lamp, or a xenon lamp; in all of them, the lamp itself must be cooled when mounted in the display device. As the cooling method, air cooling is generally adopted. That is, the lamp is cooled by utilizing airflow generated by an axial fan, a sirocco fan, or the like, the air used being dissipated into the exterior of the device.

The main purposes of this lamp cooling are: (1) to maintain the light emission efficiency of the lamp light emission tube and prevent a deterioration thereof; and (2) to cool the lamp reflector itself and reduce the radiation heat from the lamp reflector surface before discharging it to the exterior of the device.

As a result of the recent reduction in device size, or from the viewpoint of optical construction, an optical member (inclusive of a projection lens) is often arranged close to the lamp. Japanese Patent Application Laid-Open No. 2000-221599 discloses a construction in which a lamp light emission tube is intensively cooled by a fan provided between the lamp and the projection lens, and the lamp reflector itself is cooled by utilizing the suction force of an exhaust fan provided on the opposite side, with radiation heat from the lamp reflector surface being reduced before being discharged to the exterior of the device.

Japanese Patent Application Laid-Open No. 2003-131166 discloses, as an embodiment, a construction in which a cooling fan is provided in the gap between the lamp and the projection lens or the color separation/composition optical system.

However, in the construction as disclosed in Japanese Patent Application Laid-Open No. 2000-221599, the fan provided between the lamp-and the projection lens serves to intensively cool the light emission tube of the lamp, and the cooling of the lamp reflector is effected by utilizing the suction force of the exhaust fan provided on the opposite side. In this construction, when the heat generation amount of the lamp itself is very large, the cooling of the lamp reflector is not effected sufficiently, with the result that the lamp reflector surface attains high temperature. Then, radiation heat from the lamp reflector surface is conducted around the fan for cooling the light emission tube of the lamp, and there is the possibility of the component (the projection lens) close to the lamp reflector surface being heated to high temperature.

Here, when the component close to the lamp reflector surface is the projection lens, and this projection lens is formed of plastic, or the projection lens barrel itself is formed of plastic, there are involved various cases of deterioration in image projection performance due to variation in aberration caused by temperature change, a deterioration in imaging performance, a change in inter-lens distance caused by expansion/contraction of the lens barrel, mutual offset of the lenses, a deterioration in optical performance caused by inclination, etc.

Also in the case in which the component close to the lamp reflector surface is a polarization beam splitter constituting the optical elements, the polarization beam splitter itself generates heat due to the radiation heat of the lamp; in particular, when the volume of the polarization beam splitter itself is large, a temperature distribution is generated in the prism. When such a temperature distribution is generated, inner stress is generated in the optical material itself, with the result that there is generated birefringence due to the linear polarization of the incident light becoming elliptical polarization because of the elasticity of light, that is, the relationship between reflection and transmission is disturbed (Reflection and transmission cease to be effected reliably due to the generation of an undesirable polarization component), with the result that leakage light is allowed to reach the projection surface to thereby cause a deterioration in contrast, making it impossible to obtain a high-quality projection type image display device.

Similarly, in the case in which the component close to the lamp reflector surface is a liquid crystal panel (image forming element) constituting the display portion of the projection type image display device, the liquid crystal panel itself generates heat due to the lamp radiation heat; a liquid crystal is inherently easily affected by heat, and a deterioration in contrast, color heterogeneity, etc. are generated due to vaporization of the liquid crystal itself, making it impossible to obtain a high quality projection type image display device.

On the other hand, if the lamp itself is cooled by a cooling fan, due to heat radiation from the lamp, the components around the lamp (the lamp case, the lamp cover, etc.) attain high temperature as is well known in the art. In view of this, it is general practice to form the components around the lamp of a plastic material capable of withstanding the lamp radiation heat, such as PPS resin or unsaturated polyester. However, such a plastic material has low heat conductivity and high heat radiation rate, so that, when the components around the lamp once attain high temperature, it is very difficult to cool them due to their low heat conductivity; moreover, due to their high heat radiation rate, heat is allowed to fill the interior of the device, resulting in a deterioration in the cooling efficiency for the other portions in the device requiring cooling.

In view of this, it is general practice to set the air quantity and air flow rate of the fan for cooling the lamp so as to keep, as much as possible, the components around the lamp from attaining high temperature. However, it is impossible to sufficiently prevent the components around the lamp from attaining high temperature solely by adjusting the airflow from the cooling fan. In this regard, Japanese Patent Application Laid-Open No. 2002-244210 discloses a method according to which a heat shield plate is provided between the lamp and a component around the same (the lamp cover), thereby preventing the component around the lamp (the lamp cover) from attaining high temperature due to the radiation heat from the lamp.

Further, Japanese Patent Application Laid-Open No. 2003-29342 discloses a method according to which there is arranged a heat dissipating plate (a lamp shade) so as to surround the reflector portion of the lamp.

As a means for meeting the recent demand for an increase in the brightness of a projection type image display device, the lamp output is increased. This, however, involves an unexpectedly large lamp heat generation amount, that is, a great increase in lamp radiation heat amount. Thus, the heat dissipation achieved by the provision of a heat shield plate in the gap between the lamp and the component around the same (the lamp cover) as disclosed in Japanese Patent Application Laid-Open No. 2002-244210, cannot keep up with this large increase in lamp heat radiation amount, and thermal saturation of the heat shield plate itself is to be expected.

As a result, the component around the lamp (the lamp cover) is allowed to attain high temperature this time due to the radiation heat of the heat shield plate itself, so that, as in the prior art, heat fills the interior of the device. Thus, not only is the cooling efficiency for the other portions in the device requiring cooling deteriorated, but, at worst, the component around the lamp (the lamp cover) cannot withstand the heat and may suffer material damage.

In the construction as disclosed in Japanese Patent Application Laid-Open No. 2002-244210, it might be possible to prevent the component around the lamp (the lamp cover) from attaining high temperature by using a plurality of heat shield plates. However, provision of a plurality of heat shield plates would result in a product that is inadequate in terms of cost and space saving.

Further, the fact that the component around the lamp attains high temperature means that the exterior case covering that component also attains high temperature due to the radiation heat from the component. Thus, this is likely to result in a product not only rather uncomfortable for the user of the projection type image display device during operation due to the heat of the exterior case, but also undesirable from the viewpoint of product safety.

Apart from this, it might be possible to cool the component around the lamp by increasing the air quantity and air flow rate of the cooling fan. That, however, would lead to an increase in the noise due to the increase in the fan RPM and to an increase in the size of the cooling fan, which is undesirable from the viewpoint of the recent demand for a reduction in the noise and size of a projection type image display device.

SUMMARY OF THE INVENTION

The present invention has been made with a view toward solving the above problems in the prior art. It is an object of the present invention to provide a projection display device and an image projection system which help to realize efficient cooling of the light source so that no deterioration in optical performance may be involved.

Another object of the present invention, intended to solve the above problems, is to provide a light source device, a projection display device, and an image projection system in which a light source lamp is cooled and, at the same time, a component around the lamp (the lamp case) is prevented from attaining high temperature, allowing no heat to fill the interior of the device.

To attain the above objects, according to an aspect of the present invention, there is provided a projection display device which projects an image onto a projection surface by a projection optical system by using light from a light source, the projection display device including: a cooling fan arranged between the projection optical system and the light source and adapted to supply cooling air from the projection optical system to the light source; and an exterior case having an exhaust port in a vicinity of the light source and covering the projection optical system, the cooling fan, and the light source, characterized in that the projection optical system, the cooling fan, the light source, and the exhaust port are arranged substantially in a straight line.

Further, to attain the above objects, according to another aspect of the present invention, there is provided a projection display device which projects light emitted from a light source onto a projection surface through a color separation/composition optical system including an image forming element, the projection display device including: a cooling fan arranged between the color separation/composition optical system and the light source and adapted to supply cooling air from the color separation/composition optical system to the light source; and an exterior case having an exhaust port in a vicinity of the light source and covering the color separation/composition optical system, the cooling fan, and the light source, characterized in that the color separation/composition optical system, the cooling fan, the light source, and the exhaust port are arranged substantially in a straight line.

Further, to attain the above objects, according to still another aspect of the present invention, there is provided a projection display device including: a light source that sends light in a first direction; an illumination optical system that emits the light from the light source in a second direction which is substantially perpendicular to the first direction; a color separation/composition optical system including an image forming element and adapted to send the light from the illumination optical system in a third direction which is substantially opposite to the first direction; a projection optical system that projects the light from the color separation/composition optical system in the third direction; a cooling fan arranged between the projection optical system and the light source and adapted to send cooling air from the projection optical system to the light source; and an exterior case having an exhaust port in a vicinity of the light source and covering the projection optical system, the color separation/composition optical system, the illumination optical system, the cooling fan, and the light source, characterized in that the projection optical system, the cooling fan, the light source, and the exhaust port are arranged substantially in a straight line.

Further, to attain the above objects, according to still another aspect of the present invention, there is provided a projection display device including: a light source that sends light in a first direction; an illumination optical system that emits the light from the light source in a second direction which is substantially perpendicular to the first direction; a color separation/composition optical system including an image forming element and adapted to send the light from the illumination optical system in a third direction which is substantially opposite to the first direction; a projection optical system that projects the light from the color separation/composition optical system in the third direction; a cooling fan arranged between the color separation/composition system and the light source and adapted to send cooling air from the color separation/composition optical system to the light source; and an exterior case having an exhaust port in a vicinity of the light source and covering the projection optical system, the color separation/composition optical system, the illumination optical system, the cooling fan, and the light source, characterized in that the color separation/composition optical system, the cooling fan, the light source, and the exhaust port are arranged substantially in a straight line.

Further, according to still another aspect of the present invention, there is provided an image projection system including: the projection display device described above;

and an image signal supply device that supplies an image signal to the projection display device.

Further, to attain the above objects, according to still another aspect of the present invention, there is provided a light source device including: a light source lamp; a lamp case in which the light source lamp is arranged; a cooling fan that sends cooling air to the light source lamp; a duct forming an exhaust flow path for the lamp case; and a heat shield plate provided between the light source lamp and the lamp case, characterized in that the heat shield plate extends into the exhaust flow path of the duct.

Further, to attain the above objects, according to still another aspect of the present invention, there is provided a light source device including: a light source lamp; a lamp case in which the light source lamp is arranged; a ballast power source that supplies power to the light source lamp; a first cooling fan that sends cooling air to the light source lamp; a second cooling fan that sends cooling air to the ballast power source; and a heat shield plate provided between the light source lamp and the lamp case, characterized in that the heat shield plate extends into an exhaust flow path for the cooling air from the first cooling fan and into an exhaust flow path for the cooling air from the second cooling fan.

Further, to attain the above objects, according to still another aspect of the present invention, there is provided a projection display device which displays an image on a projection surface by using light from a light source portion, characterized in that the light source portion includes: a light source lamp; a lamp case in which the light source lamp is arranged; a cooling fan that sends cooling air to the light source lamp; a duct forming an exhaust flow path for the lamp case; and a heat shield plate provided between the light source lamp and the lamp case, and that the heat shield plate extends into the exhaust flow path of the duct.

Further, to attain the above objects, according to still another aspect of the present invention, there is provided a projection display device which displays an image on a projection surface by using light from a light source portion, characterized in that the light source portion includes: a light source lamp; a lamp case in which the light source lamp is arranged; a ballast power source that supplies power to the light source lamp; a first cooling fan that sends cooling air to the light source lamp; a second cooling fan that sends cooling air to the ballast power source; and a heat shield plate provided between the light source lamp and the lamp case, and that the heat shield plate extends into an exhaust flow path for the cooling air from the first cooling fan and into an exhaust flow path for the cooling air from the second cooling fan.

Further, according to still another aspect of the present invention, there is provided an image projection system including: a projection display device; and an image signal supply device that supplies an image signal to the projection display device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DETAILED DESCRIPTION OF THE PREFERRED EMBODIMENTS

In the following, embodiments of the present invention will be described with reference to the drawings.

Embodiment 1

Figure 1:
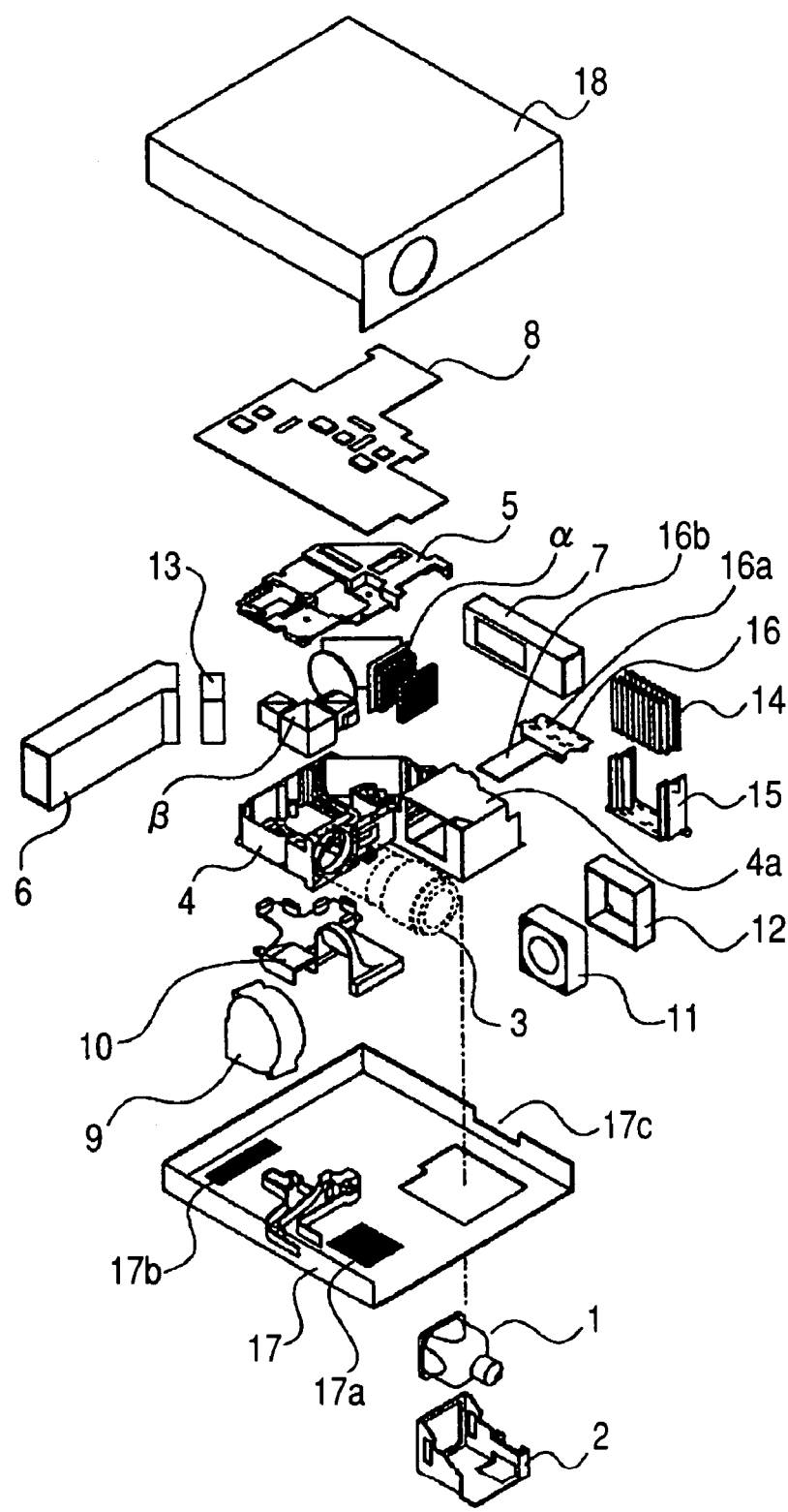
FIG. 1 is a perspective view of a projection display device according to Embodiment 1 of the present invention.

FIG. 1 shows a projection type image display device (projection display device) according to the present invention.

In FIG. 1, reference numeral 1 indicates a light source lamp, reference numeral 2 indicates a lamp holder holding the lamp 1, symbol α indicates an illumination optical system upon which light from the lamp 1 is incident, symbol β indicates a color separation/composition optical system equipped with a liquid crystal panel for three colors of R, G, and B upon which emission light from the illumination optical system is incident, and reference numeral 3 indicates a projection lens barrel upon which emission light from the color separation/composition optical system is incident and which projects an image onto a screen (projection surface) (not shown), with the projection lens barrel 3 accommodating a projection lens optical system 70 described below. Reference numeral 4 indicates an optical box which accommodates the lamp 1, the illumination optical system α, and the color separation/composition optical system β and to which the projection lens barrel 3 is fixed. Formed on the optical box 4 is a lamp case member 4a constituting a member around the lamp surrounding the lamp 1.

Reference numeral 5 indicates an optical box cover for covering the optical box 4 with the illumination optical system α and the color separation/composition optical system β accommodated therein, reference numeral 6 indicates a power source, reference numeral 7 indicates a ballast power source for lighting the lamp 1, reference numeral 8 indicates a circuit board for driving the liquid crystal panel with the power from the power source 6 and for supplying a command for lighting the lamp 1, reference numeral 9 indicates an optical system cooling fan for cooling optical elements in the color separation/composition optical system β, such as the liquid crystal panel, by sucking in air through an intake port 17a of an exterior cabinet 17 described below, and reference numeral 10 indicates a fan duct for supplying air from the optical system cooling fan 9 to optical elements in the color separation/composition optical system β, such as the liquid crystal panel.

Reference numeral 11 indicates a light source lamp cooling fan for cooling the lamp 1 by blowing air against the lamp 1; it is arranged in the gap between the lamp 1 and the projection lens barrel 3 at a predetermined interval. Reference numeral 12 indicates a fan holding base for holding the lamp cooling fan 11, and reference numeral 13 indicates a power source cooling fan which circulates air through the power source 6 by sucking in air through an intake port 17b provided in the exterior cabinet 17 described below and which simultaneously cool the power source 6 and the ballast power source 7 by circulating airflow due to blowing force through the ballast power source 7. After being blown against the ballast power source 7 by the power source cooling fan 13, the air passes through the ballast power source 7, and is discharged to the exterior of the projection type image display device through an exhaust port 17c provided in the exterior cabinet 17 described below.

Reference numeral 14 indicates an exhaust louver for discharging the hot air due to the lamp cooling fan 11 after having passed the lamp 1 to the exterior of the projection type image display device (wherein the exhaust louver allows passage of air to the exterior of the device but does not allow leakage of light to the exterior of the device), reference numeral 15 indicates a ventilation duct for holding the exhaust louver 14 and allowing passage of the hot air having passed the lamp 1, and reference numeral 16 indicates a heat shield member (heat shield plate) which has a main body portion 16a arranged in the gap between the lamp 1 and the lamp case member 4a, with the main body portion 16a being fixed to the lamp case member 4a with a gap also with respect to the lamp case member 4a. Further, the heat shield member 16 has an extension portion 16b adapted to cover the ventilation duct 15, with the exhaust louver 14 being accommodated in the ventilation duct 15. That is, the extension portion 16b of the heat shield member 16 is formed so as to enter the ventilation duct 15, forming a ventilation path allowing passage of hot air from the lamp between the ventilation duct 15 and the extension portion 16b. Further, the heat shield member 16 is formed of a material, such as an aluminum plate, having a higher heat conductivity and a lower heat radiation rate than the lamp case member 4a constituting the component around the lamp.

Reference numeral 17 indicates the exterior cabinet (the lower portion of the exterior case) for accommodating the optical box 4, etc., and reference numeral 18 indicates an external cabinet cover (the upper portion of the external case) for covering the exterior cabinet 17 with the optical box 4, etc. accommodated therein.

Next, to be described with reference to FIG. 2 will be the optical construction of a projection type image display device with a reflection type liquid crystal display element (an image forming element, such as a reflection type liquid crystal panel) composed of the lamp 1, the illumination optical system α, the color separation/composition optical system β, and a projection lens optical system 70 in the projection lens barrel 3 (see FIG. 2).

Figure 2:
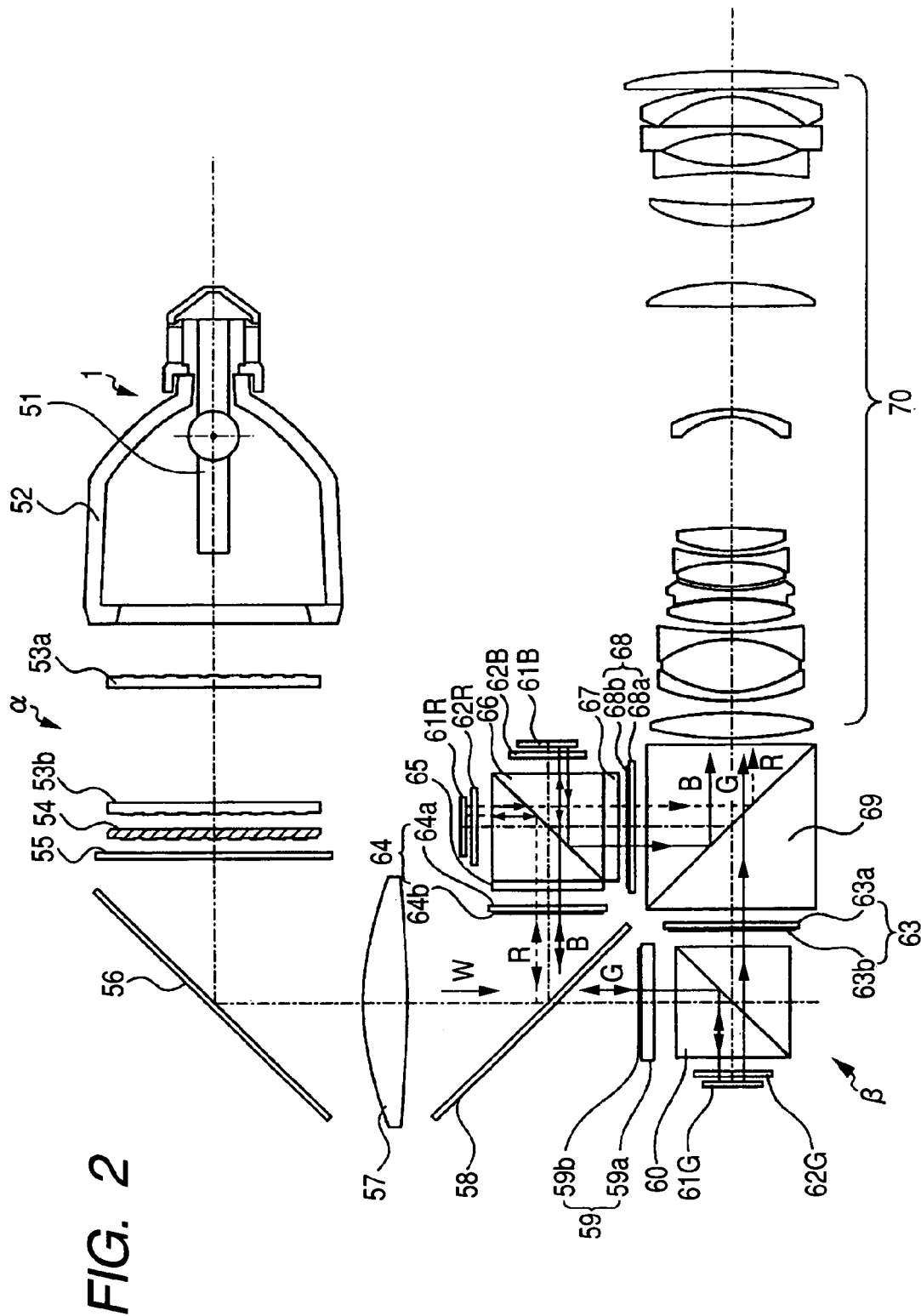
FIG. 2 is a diagram showing a projection display device according to the present invention with a reflection type liquid crystal display element mounted therein.

In FIG. 2, reference numeral 51 indicates a light emission tube emitting white light in continuous spectrum, and reference numeral 52 indicates a reflector condensing the light from the light emission tube 51 in a predetermined direction, with the lamp 1 being formed by the light emission tube 51 and the reflector 52. Symbol 53a indicates a first fly-eye lens with rectangular lenses arranged in a matrix-like fashion, symbol 53b indicates a second fly-eye lens consisting of a lens array corresponding to the individual lenses of the first fly-eye lens, and reference numeral 54 indicates a polarization conversion device adapted to adjust a non-polarized light to a predetermined polarized light. Reference numeral 55 indicates an ultraviolet screen filter, reference numeral 56 indicates a reflection mirror for converting the optical axis by 90 degrees, and reference numeral 57 indicates a condenser lens. The above components form the illumination optical system α.

Reference numeral 58 indicates a dichroic mirror adapted to reflect light in the wavelength ranges of blue (B) and red (R) and to transmit light in the wavelength range of green (G), and reference numeral 59 indicates an incidence side polarization plate for G which is formed by attaching a polarization element 59b to a transparent substrate 59a and which only transmits S-polarized light. Reference numeral 60 indicates a first polarization beam splitter which is adapted to transmit P-polarized light and to reflect S-polarized light and which has a polarization separation surface.

Symbols 61R, 61G, and 61B respectively indicate a reflection type liquid crystal display element for R, a reflection type liquid crystal display elements for G, and a reflection type liquid crystal display element for B each adapted to reflect incident light and to effect image modulation. Symbols 62R, 62G, and 62B respectively indicate a ¼ wavelength plate for R, a ¼ wavelength plate for G, and a ¼ wavelength plate for B. Reference numeral 63 indicates an emission side polarization plate for G which is formed by attaching a polarization element 63b to a transparent substrate 63a and which only transmits P-polarized light. Reference numeral 64 indicates an incidence side polarization plate for R and B which is formed by attaching a polarization element 64b to a transparent substrate 64a and which only transmits S-polarized light. Reference numeral 65 indicates a first color selective phase difference plate which converts the polarizing direction of B light by 90 degrees but does not convert the polarizing direction of R light. Reference numeral 66 indicates a second polarization beam splitter which transmits P-polarized light but reflects S-polarized light and which has a polarization separation surface. Reference numeral 67 indicates a second color selective phase difference plate which converts the polarizing direction of R light by 90 degrees but does not convert the polarizing direction of B light. Attached to the second polarization beam splitter 66 are the first color selective phase difference plate 65 and the second color selective phase difference plate 67. Reference numeral 68 indicates an emission side polarization plate for R and B which is formed by attaching a polarization element 68b to a transparent substrate 68a and which only transmits S-polarized light. Reference numeral 69 indicates a third polarization beam splitter (color composition means) which transmits P-polarized light but reflects S-polarized light and which has a polarization separation surface.

The above-mentioned components from the dichroic mirror 58 through the third polarization beam splitter 69 constitute a color separation/composition optical system.

Reference numeral 70 indicates the projection lens optical system, and the illumination optical system, the color separation/composition optical system, and the projection lens optical system constitute an image display optical system.

Next, the optical operation of the above system will be described.

Light emitted from the light emission tube 51 is condensed in a predetermined direction by the reflector 52. The reflector 52 has a parabolic configuration, and the light from the focal position of the paraboloid becomes a light parallel to the symmetry axis of the parabolid. It should be noted, however, that the light source consisting of the light emission tube 51 is not an ideal point light source but has a finite size, so that the condensed light also contains a lot of light components that are not parallel to the symmetry axis of the parabolid. Those condensed lights strike the first fly-eye lens 53a. The first fly-eye lens 53a is formed by combining lenses having a rectangular outer shape and positive refractive power with each other in a matrix-like fashion, and the incident light is separated and condensed into a plurality of lights respectively corresponding to the individual lenses, and the lights travel by way of the second fly-eye lens 53b to form a plurality of light source images in a matrix-like fashion in the vicinity of the polarization conversion device 54.

The polarization conversion device 54 is composed of a polarization separation surface, a reflection surface, and a ½ wavelength plate, and the plurality of lights condensed in a matrix-like fashion strike the polarization separation surface corresponding to the row to be separated into a P-polarized light component that is transmitted and an S-polarized light component that is reflected. The reflected S-polarized light component is reflected by the reflection surface, and is emitted in the same direction as the P-polarized light component. On the other hand, the transmitted P-polarized light component is transmitted through the ½ wavelength plate, and is converted to the same polarized light component as the S-polarized light component before being emitted as a light aligned in the polarizing direction. The plurality of polarization-converted lights are emitted from the polarization conversion device 54, and are then transmitted through the ultraviolet screen filter 55 to be reflected by 90 degrees by the reflection mirror 56 to thereby reach the condenser lens 57 as divergent lights.

Due to the lens refractive index of the condenser lens 57, the plurality of lights form a rectangular, uniform illumination area in which rectangular images are superimposed one upon the other. In this illumination area, the reflection type liquid crystal display elements 61R, 61G, and 61B, described below, are arranged. Next, the light converted to S-polarized light by the polarization conversion device 54 strikes the dichroic mirror 58. The dichroic mirror reflects B light (430 to 495 nm) and R light (590 to 650 nm) and transmits G light (505 to 580 nm).

Next, the optical path for G light be described.

The G light transmitted through the dichroic mirror 58 strikes the incidence side polarization plate 59. Even after the separation by the dichroic mirror 58, the G light remains S-polarized light. Then, after being emitted from the incidence side polarization plate 59, the G light strikes the first polarization beam splitter 60 as S-polarized light and is reflected by the polarization separation surface before reaching the reflection type liquid crystal display element 61G for G. In the reflection type liquid crystal display element 61G for G, the G light undergoes image modulation and is reflected. Of the image-modulated G reflected light, the S-polarized light component is reflected again by the polarization separation surface of the first polarization beam splitter 60 to be returned to the light source side and removed from the projection light. On the other hand, of the image-modulated G reflected light, the P-polarized light component is transmitted through the polarization separation surface of the first polarization beam splitter 60, and heads for the third polarization beam splitter 69 as projection light. In the state in which all the polarized light components have been converted to S-polarized light (in the case of black display), the lag phase axis of the ¼ wavelength plate 62G provided between the first polarization beam splitter 60 and the reflection type liquid crystal display element 61G for G is adjusted to a predetermined direction, whereby it is possible to minimize the influence of the disturbance in the polarized state generated in the first polarization beam splitter 60 and the reflection type liquid crystal display element 61G for G. The G light emitted from the first polarization beam splitter 60 is analyzed by the emission side polarization plate 63, which only transmits P-polarized light. As a result, there is obtained a light from which the ineffective component generated by passage through the first polarization beam splitter 60 and the reflection type liquid crystal display element 61G for G has been cut off. Then, the G light strikes the third polarization beam splitter 69 as P-polarized light, and is transmitted through the polarization separation surface of the third polarization beam splitter 60 to reach the projection lens 70.

On the other hand, the R and B lights reflected by the dichroic mirror 58 strike the incidence side polarization plate 64. Even after separation by the dichroic mirror 58, the R and B lights remain S-polarized lights. Then, after being emitted from the incidence side polarization plate 64, the R and B lights strike the first color selective phase difference plate 65. The first color selective phase difference plate 65 is adapted to turn only the polarizing direction of the B light by 90 degrees, whereby the B light and the R light strike the second polarization beam splitter 66 as P-polarized light and S-polarized light, respectively. The R light striking the second polarization beam splitter 66 as S-polarized light is reflected by the polarization separation surface of the second polarization beam splitter 66, and reaches the reflection type liquid crystal display element 61R for R. The B light striking the second polarization beam splitter 66 as P-polarized light is transmitted through the polarization separation surface of the second polarization beam splitter 66, and reaches the reflection type liquid crystal display element 61B for B.

The R light striking the reflection type liquid crystal display element 61R for R is image-modulated and reflected. Of the image-modulated R reflection light, the S-polarized light component is reflected by the polarization separation surface of the second polarization beam splitter 66 again and is returned to the light source side to be removed from the projection light. On the other hand, of the image-modulated R reflection light, the P-polarized light component is transmitted through the polarization separation surface of the second polarization beam splitter 66 and heads for the second color selective phase plate 67 as projection light.

The B light striking the reflection type liquid crystal display element 61B for B is image-modulated and reflected. Of the image-modulated B reflection light, the P-polarized light component is transmitted through the polarization separation surface of the second polarization beam splitter 66 again and is returned to the light source side to be removed from the projection light. On the other hand, of the image-modulated B reflection light, the S-polarized light component is reflected by the polarization separation surface of the second polarization beam splitter 66, and heads for the second color selective phase plate 67 as projection light.

At this time, the lag phase axes of the ¼ wavelength plates 62R and 62B provided between the second polarization beam splitter 66 and the reflection type liquid crystal display elements 61R and 61B for R and B are adjusted, whereby it is possible, as in the case of G, to adjust black display for R and B.

Of the projection lights of R and B thus combined into a single ray of light and emitted from the second polarization beam splitter 66, the R light is turned in polarizing direction by 90 degrees by the second color selective phase plate 67 to become S-polarized light component, and is further analyzed by the emission side polarization plate 68 before striking the third polarization beam splitter 69. The B light is transmitted through the second color selective phase plate 67 as S-polarized light as it is, and is further analyzed by the emission side polarization plate 68 before striking the third polarization beam splitter 69. By being analyzed by the emission side polarization plate 68, the R and B projection lights become lights from which ineffective components, generated by their passing through the second polarization beam splitter 66, the reflection type liquid crystal display elements 61R and 61B for R and B, and the ¼ wavelength plates 62R and 62B, have been cut off.

Then, the R and B projection lights striking the third polarization beam splitter 69 are reflected by the polarization separation surface of the third polarization beam splitter 69, and are combined with the G light reflected by the polarization separation surface before reaching the projection lens 70.

Then, the combined R, G, and B projection lights are projected in an enlarged state onto a projection surface, such as a screen, by the projection lens 70.

The above-described optical paths are those in the case in which the reflection type liquid crystal display element effects white display; in the following, the optical paths in the case in which the reflection type liquid crystal display element effects black display will be described.

First, the optical path for G light will be described.

The S-polarized light of the G light transmitted through the dichroic mirror 58 strikes the incidence side polarization plate 59; thereafter, it strikes the first polarization beam splitter 60, and is reflected by the polarization separation surface to reach the reflection type liquid crystal display element 61G for G. However, since the reflection type liquid crystal display element 61G effects black display, the G light is reflected without being image-modulated. Thus, even after being reflected by the reflection type liquid crystal display element 61G, the G light remains S-polarized light, so that it is reflected again by the polarization separation surface of the first polarization beam splitter 60, and is transmitted through the incidence side polarization plate 59 to be returned to the light source side before being removed from the projection light.

Next, the optical paths for R and B will be described.

The S-polarized lights of the R and B lights reflected by the dichroic mirror 58 strike the incidence side polarization plate 64. Then, after being emitted from the incidence side polarization plate 64, the R and B lights strike the first color selective phase difference plate 65. The first color selective phase difference plate 65 is adapted to turn the polarizing direction of only B light by 90 degrees, whereby the B light and the R light strike the second polarization beam splitter 66 as P-polarized light and S-polarized light, respectively. The R light striking the second polarization beam splitter 66 as S-polarized light is reflected by the polarization separation surface of the second polarization beam splitter 66, and reaches the reflection type liquid crystal display element 61R for R. The B light striking the second polarization beam splitter 66 as P-polarized light is transmitted through the polarization separation surface of the second polarization beam splitter 66 to reach the reflection type liquid crystal display element 61B for B. Here, the reflection type liquid crystal display element 61R for R effects black display, so that the R light striking the reflection type liquid crystal display element 61R for R is reflected without undergoing image modulation. Thus, even after being reflected by the reflection type liquid crystal display element 61R for R, the R light remains S-polarized light, so that it is reflected again by the polarization separation surface of the first polarization beam splitter 60, and is transmitted through the incidence side polarization plate 64 to be returned to light source side and removed from the projection light, resulting in black display. On the other hand, since the reflection type liquid crystal display element 61B for B effects black display, the B light striking the reflection type liquid crystal display element 61B for B is reflected without undergoing image modulation. Thus, even after being reflected by the reflection type liquid crystal element 61B for B, the B light remains P-polarized light, so that it is transmitted again through the polarization separation surface of the first polarization beam splitter 60, and is converted to S-polarized light by the first color selective phase difference plate 65 and transmitted through the incidence side polarization plate 64 to be returned to the light source side and removed from the projection light.

The optical construction of the projection type image display device using a reflection type liquid crystal display element (reflection type liquid crystal panel) is as described above.

Next, the mechanical construction of the lamp cooling portion in the projection type image display device will be described in detail with reference to FIGS. 3 and 4.

Figure 3:
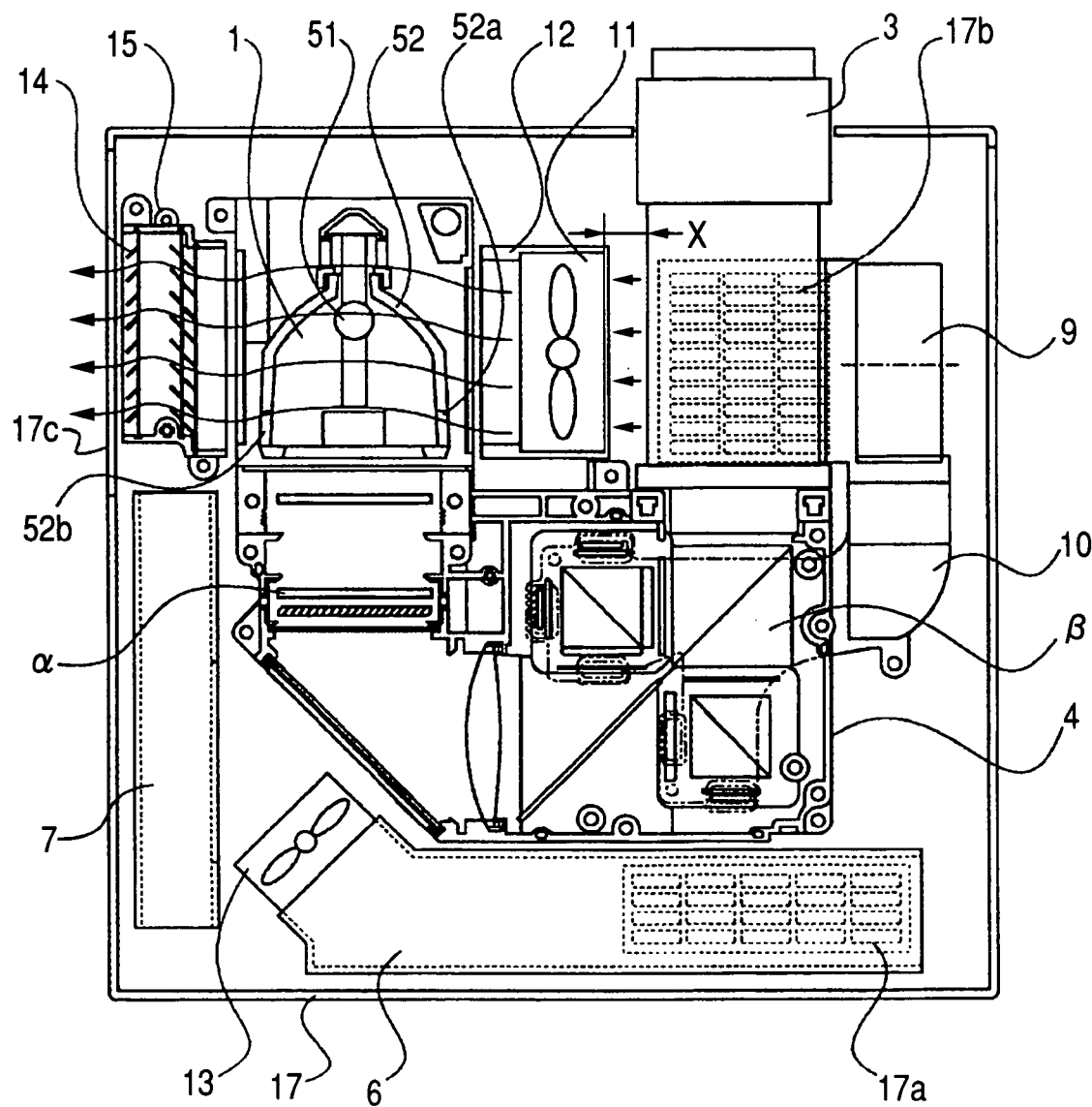
FIG. 3 is a plan view of the mechanical construction for lamp cooling according to Embodiment 1 of the present invention.
Figure 4:
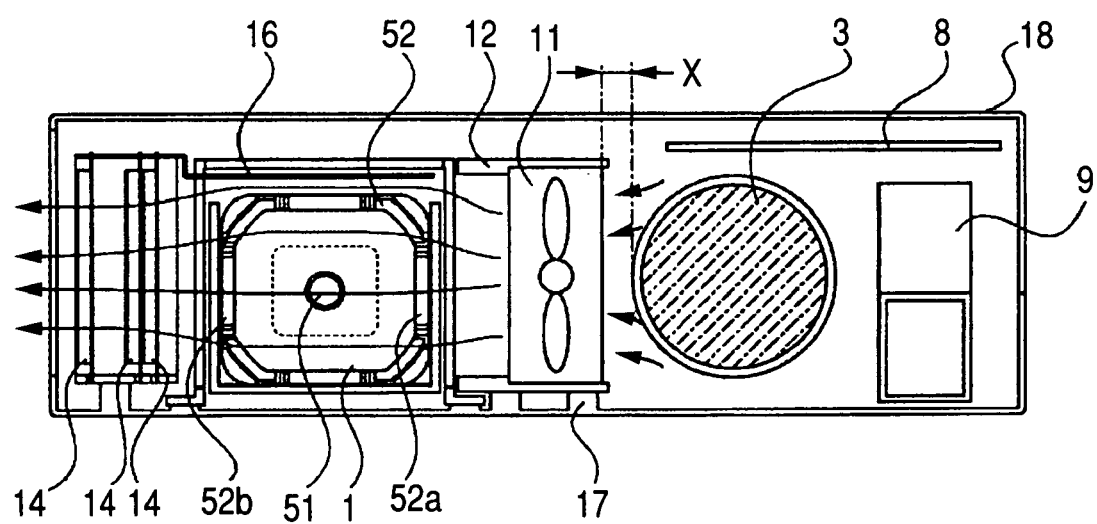
FIG. 4 is a sectional view of the mechanical construction for lamp cooling according to Embodiment 1 of the present invention.

In FIGS. 3 and 4, due to the above-described optical construction, the lamp 1 and the projection lens barrel 3 are arranged close to each other, while the lamp cooling fan 11 cools the lamp 1 by sending airflow to the lamp 1, and is arranged in the gap between the lamp 1 and the projection lens barrel 3 at a predetermined interval. Further, accommodated in the projection lens barrel 3 is the projection lens system 70 shown in FIG. 2, in at least part of which plastic lenses are mounted so as to meet the recent demand for a reduction in product size, an increase in power, a reduction in cost, etc. Further, the lens barrel retaining the projection lens system 70 is also partially formed of a plastic material (e.g., polycarbonate material).

Next, the airflow generated by the lamp cooling fan 11 will be described.

As can be seen from FIGS. 3 and 4, as the method for cooling the lamp 1, there is adopted a cooling method utilizing the blowing force of the lamp cooling fan 11, so that the airflow generated by the lamp cooling fan 11 is as follows: through rotation of the lamp cooling fan 11, an airflow due to suction force is produced for the projection lens barrel 3 to cool the projection lens barrel 3 itself, while the air from the lamp cooling fan 11 flows as it is in the direction of the lamp 1 to strike the reflector 52. A portion of this air passes through a cutout portion (an opening) 52a provided in the reflector 52 to hit the light emission tube 51, thereby cooling the light emission tube 51. The purpose of cooling the light emission tube 51 is to keep the temperature of the light emission tube 51 at a fixed level to thereby maintain an appropriate lamp brightness. Then, the air passes through another cutout portion (another opening) 52b provided in the reflector 52, and is discharged to the exterior of the projection type image display device through the exhaust louver 14. On the other hand, most of the air hitting the reflector 52 flows around the reflector 52 while cooling the reflector 52 itself before reaching the exhaust louver 14; thereafter, the air is discharged to the exterior of the projection type image display device.

In this construction, the lamp cooling fan 11 blows air directly against the projection lens barrel 3 side surface of the reflector 52 of the lamp 1 to effect cooling, so that, as compared with the exhaust louver 14 side surface of the reflector 52, the projection lens barrel 3 side surface of the reflector 52 exhibits less radiation heat from the lamp (The cooling air directly hits the projection lens barrel 3 side surface of the reflector 52 as it is, so that the temperature distribution on the reflector 52 is such that the temperature of the projection lens barrel 3 side surface of the reflector 52 is lower), whereby the influence of the lamp radiation heat on the projection lens barrel 3 is suppressed as much as possible. Thus, even when, for example, the components of the projection lens barrel 3 and the projection lens system 70 (see FIG. 2) are formed of plastic material, they are not easily affected by a variation in aberration caused by temperature change, a deterioration in imaging performance, variation in inter-lens distance caused by expansion/contraction of the lens barrel, mutual offset of the lenses, a deterioration in optical performance caused by inclination, etc., so that it is possible to obtain a high-quality projection type image display device.

On the other hand, it is so arranged that the air from the lamp cooling fan 11 flows substantially linearly from the projection lens barrel 3 to the lamp 1, so that the air can be smoothly discharged to the exterior of the projection type image display device with as little resistance as possible, whereby efficient cooling is possible, and a sufficient cooling capacity is obtained even if the fan voltage of the lamp cooling fan 11 is reduced, thereby making it possible to obtain a high-quality projection type image display device also superior in terms of noise reduction.

Next, a distance X between the projection lens barrel 3 and the lamp cooling fan 11 (see FIGS. 3 and 4) will be discussed with reference to FIGS. 5 and 6.

Figure 5:
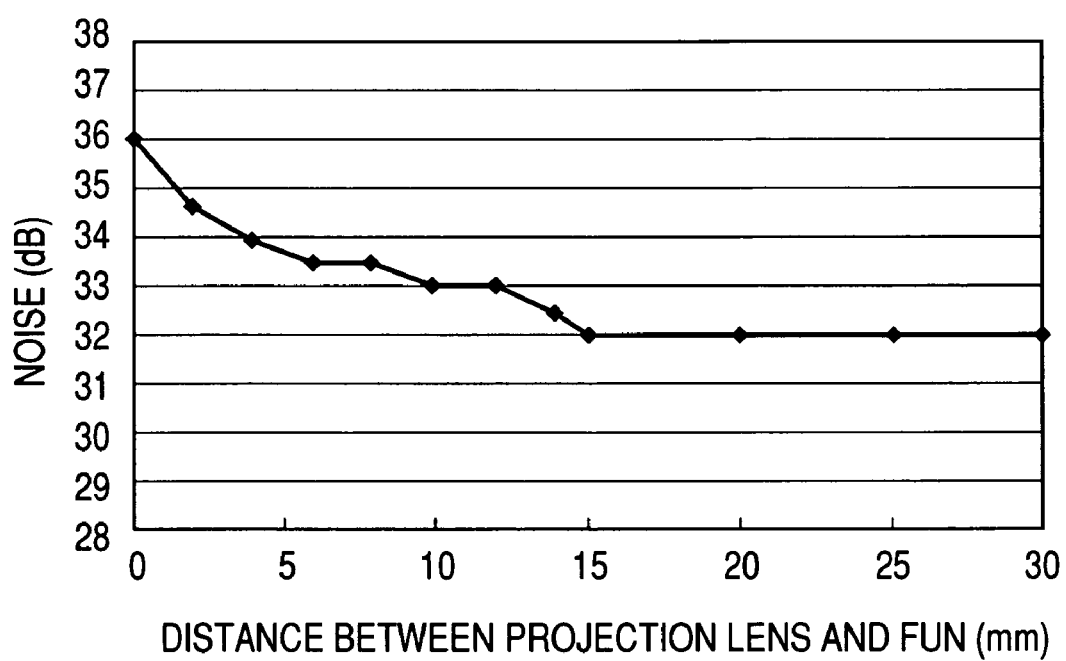
FIG. 5 is a graph showing the relationship between the noise and the distance between a lamp cooling fan and a projection lens barrel according to Embodiment 1 of the present invention.

FIG. 5 is a graph indicating the relationship between the noise of the lamp cooling fan 11 and the distance X between the projection lens barrel 3 and the intake port of the lamp cooling fan 11. Generally speaking, to reduce the fan noise (whizzing sound), it is naturally so arranged that an obstacle (which, in this case, is the projection lens barrel 3) is situated as far as possible from the fan intake port. An experiment on the distance X showed that there is no change in noise level when the distance is 15 mm or more; when the distance ranges from 5 to 15 mm, the noise level is increased to some degree, and, when the distance is 5 mm or less, the noise level rises abruptly. That is, by spacing the intake port of the lamp cooling fan 11 apart from the projection lens barrel 3 by at least 5 mm, it is possible to obtain a projection type image display device superior in terms of noise reduction.

Figure 6:
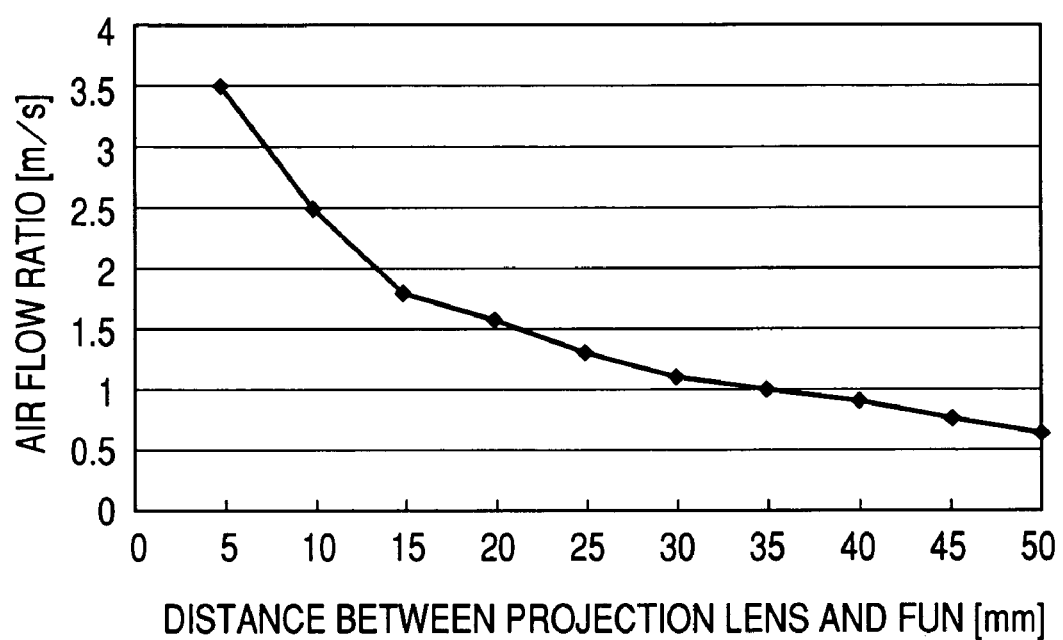
FIG. 6 is a graph showing the relationship between the air flow rate and the distance between the lamp cooling fan and the projection lens barrel according to Embodiment 1 of the present invention.

FIG. 6 is a graph indicating the relationship between the air flow rate at the position of the projection lens barrel 3 due to the lamp cooling fan 11 and the distance X between the projection lens barrel 3 and the lamp cooling fan 11. Generally speaking, to cool the component to be cooled (which, in the case of Embodiment 1, is the projection lens barrel 3), an air flow rate of 1 m/s or more is required; at an air flow rate of 1 m/s or less, the circulation of the cooling air is incomplete, and the possibility of a deterioration in cooling efficiency is high. An experiment showed that, when the distance X between the projection lens barrel 3 and the intake port of the lamp cooling fan 11 is 40 mm or more, the resultant air flow rate is 1 m/s or less.

Thus, as can be seen from FIGS. 5 and 6, by setting the distance X between the projection lens barrel 3 and the intake port of the lamp cooling fan 11 at 5 mm to 40 mm, it is possible to obtain a high-quality projection type image display device involving no reduction in cooling efficiency of the lamp cooling fan 11 nor an increase in noise.

Embodiment 2

Next, the lamp cooling fan arrangement with respect to a projection type image display device of a different optical construction will be described with reference to FIG. 7.

First, the optical construction of the projection type image display device will be described with reference to FIG. 7.

Reference numeral 81 indicates a light emission tube emitting white light in continuous spectrum, and reference numeral 82 indicates a reflector condensing the light from the light emission tube 81 in a predetermined direction, with a lamp A being formed by the light emission tube 81 and the reflector 82. Symbol 83a indicates a first fly-eye lens with rectangular lenses arranged in a matrix-like fashion, symbol 83b indicates a second fly-eye lens consisting of a lens array corresponding to the individual lenses of the first fly-eye lens, reference numeral 84 indicates a reflection mirror for converting the optical axis by 90 degrees, and reference numeral 85 indicates a polarization conversion device adapted to adjust a non-polarized light to a predetermined polarized light. Reference numeral 86 indicates an ultraviolet screen filter, and reference numeral 87 indicates a condenser lens. The above components form the illumination optical system α.

Reference numeral 88 indicates a dichroic mirror adapted to reflect light in the wavelength ranges of blue (B) and red (R) and to transmit light in the wavelength range of green (G), and reference numeral 89 indicates an incidence side polarization plate for G which is formed by attaching a polarization element 89b to a transparent substrate 89a and which only transmits S-polarized light. Reference numeral 90 indicates a first polarization beam splitter which is adapted to transmit P-polarized light and to reflect S-polarized light and which has a polarization separation surface.

Symbols 91R, 91G, and 91B respectively indicate a reflection type liquid crystal display element for R, a reflection type liquid crystal display element for G, and a reflection type liquid crystal display element for B. Symbols 92R, 92G, and 92B respectively indicate a ¼ wavelength plate for R, a ¼ wavelength plate for G, and a ¼ wavelength plate for B. Reference numeral 93 indicates an emission side polarization plate for G which is formed by attaching a polarization element 93b to a transparent substrate 93a and which only transmits P-polarized light. Reference numeral 94 indicates an incidence side polarization plate for R and B which is formed by attaching a polarization element 94b to a transparent substrate 94a and which only transmits S-polarized light. Reference numeral 95 indicates a first color selective phase difference plate which converts the polarizing direction of B light by 90 degrees but does not convert the polarizing direction of R light. Reference numeral 96 indicates a second polarization beam splitter which transmits P-polarized light but reflects S-polarized light and which has a polarization separation surface. Reference numeral 97 indicates a second color selective phase difference plate which converts the polarizing direction of R light by 90 degrees but does not convert the polarizing direction of B light. Attached to the second polarization beam splitter 96 are the first color selective phase difference plate 95 and the second color selective phase difference plate 97. Reference numeral 98 indicates an emission side polarization plate for R and B which is formed by attaching a polarization element 98b to a transparent substrate 98a and which only transmits S-polarized light. Reference numeral 99 indicates a third polarization beam splitter (color composition means) which transmits P-polarized light but reflects S-polarized light and which has a polarization separation surface.

The above-mentioned components from the dichroic mirror 88 through the third polarization beam splitter 99 constitute a color separation/composition optical system.

Reference numeral 100 indicates a projection lens optical system, and the illumination optical system, the color separation/composition optical system, and the projection lens optical system constitute an image display optical system.

Next, the optical operation of the above system will be described.

Light emitted from the light emission tube 81 is condensed in a predetermined direction by the reflector 82. The reflector 82 has a parabolic configuration, and the light from the focal position of the paraboloid becomes a light parallel to the symmetry axis of the parabolid. It should be noted, however, that the light source consisting of the light emission tube 81 is not an ideal point light source but has a finite size, so that the condensed light also contains a lot of light components that are not parallel to the symmetry axis of the parabolid. Those condensed lights strike the first fly-eye lens 83a. The first fly-eye lens 83a is formed by combining lenses having a rectangular outer shape and positive refractive power with each other in a matrix-like fashion, and the incident light is separated and condensed into a plurality of lights respectively corresponding to the individual lenses; and reflected by 90 degrees by the reflection mirror 84, and travel by way of the second fly-eye lens 83b to form a plurality of light source images in a matrix-like fashion in the vicinity of the polarization conversion device 85.

The polarization conversion device 85 is composed of a polarization separation surface and a ½ wavelength plate, and the plurality of lights condensed in a matrix-like fashion strike the polarization separation surface corresponding to the row to be separated into a P-polarized light component that is transmitted and an S-polarized light component that is reflected. The reflected S-polarized light component is reflected by the reflection surface, and is emitted in the same direction as the P-polarized light component. On the other hand, the transmitted P-polarized light component is transmitted through the ½ wavelength plate, and is converted to the same polarized light component as the S-polarized light component before being emitted as a light aligned in the polarizing direction. The plurality of polarization-converted lights are emitted from the polarization conversion device 85, and are then transmitted through the ultraviolet screen filter 86 to reach the condenser lens 87 as divergent lights.

Due to the lens refractive index of the condenser lens 87, the plurality of lights form a rectangular, uniform illumination area in which rectangular images are superimposed one upon the other. In this illumination area, the reflection type liquid crystal display elements 91R, 91G, and 91B, described below, are arranged. Next, the light converted to S-polarized light by the polarization conversion device 85 strikes the dichroic mirror 88. The dichroic mirror 88 reflects B light (430 to 495 nm) and R light (590 to 650 nm) and transmits G light (505 to 580 nm).

Next, the optical path for G light will be described.

The G light transmitted through the dichroic mirror 88 strikes the incidence side polarization plate 89. Even after the separation by the dichroic mirror 88, the G light remains S-polarized light. Then, after being emitted from the incidence side polarization plate 89, the G light strikes the first polarization beam splitter 90 as S-polarized light and is reflected by the polarization separation surface before reaching the reflection type liquid crystal display element 91G for G. In the reflection type liquid crystal display element 91G for G, the G light undergoes image modulation and is reflected. Of the image-modulated G reflected light, the S-polarized light component is reflected again by the polarization separation surface of the first polarization beam splitter 90 to be returned to the light source side and removed from the projection light. On the other hand, of the image-modulated G reflected light, the P-polarized light component is transmitted through the polarization separation surface of the first polarization beam splitter 90, and heads for the third polarization beam splitter 99 as projection light. In the state in which all the polarized light components have been converted to S-polarized light (in the case of black display), the lag phase axis of the ¼ wavelength plate 92G provided between the first polarization beam splitter 90 and the reflection type liquid crystal display element 91G for G is adjusted to a predetermined direction, whereby it is possible to minimize the influence of the disturbance in the polarized state generated in the first polarization beam splitter 90 and the reflection type liquid crystal display element 91G for G. The G light emitted from the first polarization beam splitter 90 is analyzed by the emission side polarization plate 93, which only transmits P-polarized light. As a result, there is obtained a light from which the ineffective component generated by passage through the first polarization beam splitter 90 and the reflection type liquid crystal display element 91G for G has been cut off. Then, the G light strikes the third polarization beam splitter 99 as P-polarized light, and is transmitted through the polarization separation surface of the third polarization beam splitter 99 to reach the projection lens 100.

On the other hand, the R and B lights reflected by the dichroic mirror 88 strike the incidence side polarization plate 94. Even after separation by the dichroic mirror 88, the R and B lights remain S-polarized lights. Then, after being emitted from the incidence side polarization plate 94, the R and B lights strike the first color selective phase difference plate 95. The first color selective phase difference plate 95 is adapted to turn only the polarizing direction of the B light by 90 degrees, whereby the B light and the R light strike the second polarization beam splitter 96 as P-polarized light and S-polarized light, respectively. The R light striking the second polarization beam splitter 96 as S-polarized light is reflected by the polarization separation surface of the second polarization beam splitter 96, and reaches the reflection type liquid crystal display element 91R for R. The B light striking the second polarization beam splitter 96 as P-polarized light is transmitted through the polarization separation surface of the second polarization beam splitter 96, and reaches the reflection type liquid crystal display element 91B for B.

The R light striking the reflection type liquid crystal display element 91R for R is image-modulated and reflected. Of the image-modulated R reflection light, the S-polarized light component is reflected by the polarization separation surface of the second polarization beam splitter 96 again and is returned to the light source side to be removed from the projection light. On the other hand, of the image-modulated R reflection light, the P-polarized light component is transmitted through the polarization separation surface of the second polarization beam splitter 96 and heads for the second color selective phase plate 97 as projection light.

The B light striking the reflection type liquid crystal display element 91B for B is image-modulated and reflected. Of the image-modulated B reflection light, the P-polarized light component is transmitted through the polarization separation surface of the second polarization beam splitter 96 again and is returned to the light source side to be removed from the projection light. On the other hand, of the image-modulated B reflection light, the S-polarized light component is reflected by the polarization separation surface of the second polarization beam splitter 96, and heads for the second color selective phase plate 97 as projection light.

At this time, the lag phase axes of the ¼ wavelength plates 92R and 92B provided-between the second polarization beam splitter 96 and the reflection type liquid crystal display elements 91R and 91B for R and B are adjusted, whereby it is possible, as in the case of G, to adjust black display for R and B.

Of the projection lights of R and B thus combined into a single ray of light and emitted from the second polarization beam splitter 96, the R light is turned in polarizing direction by 90 degrees by the second color selective phase plate 97 to become S-polarized light component, and is further analyzed by the emission side polarization plate 98 before striking the third polarization beam splitter 99. The B light is transmitted through the second color selective phase plate 97 as S-polarized light as it is, and is further analyzed by the emission side polarization plate 98 before striking the third polarization beam splitter 99. By being analyzed by the emission side polarization plate 98, the R and B projection lights become lights from which ineffective components, generated by their passing through the second polarization beam splitter 96, the reflection type liquid crystal display elements 91R and 91B for R and B, and the ¼ wavelength plates 92R and 92B, have been cut off.

Then, the R and B projection lights striking the third polarization beam splitter 99 are reflected by the polarization separation surface of the third polarization beam splitter 99, and are combined with the G light reflected by the polarization separation surface before reaching the projection lens 100.

Then, the combined R, G, and B projection lights are projected in an enlarged state onto a projection surface, such as a screen, by the projection lens 100.

The above-described optical paths-are those in the case in which the reflection type liquid crystal display element effects white display; in the following, the optical paths in the case in which the reflection type liquid crystal display element effects black display will be described.

First, the optical path for G light will be described.

The S-polarized light of the G light transmitted through the dichroic mirror 88 strikes the incidence side polarization plate 89; thereafter, it strikes the first polarization beam splitter 90, and is reflected by the polarization separation surface to reach the reflection type liquid crystal display element 91G for G. However, since the reflection type liquid crystal display element 91G effects black display, the G light is reflected without being image-modulated. Thus, even after being reflected by the reflection type liquid crystal display element 91G, the G light remains S-polarized light, so that it is reflected again by the polarization separation surface of the first polarization beam splitter 90, and is transmitted through the incidence side polarization plate 89 to be returned to the light source side before being removed from the projection light.

Next, the optical paths for R and B will be described.

The S-polarized lights of the R and B lights reflected by the dichroic mirror 88 strike the incidence side polarization plate 94. Then, after being emitted from the incidence side polarization plate 94, the R and B lights strike the first color selective phase difference plate 95. The first color selective phase difference plate 95 is adapted to turn the polarizing direction of only B light by 90 degrees, whereby the B light and the R light strike the second polarization beam splitter 96 as P-polarized light and S-polarized light, respectively. The R light striking the second polarization beam splitter 96 as S-polarized light is reflected by the polarization separation surface of the second polarization beam splitter 96, and reaches the reflection type liquid crystal display element 91R. The B light striking the second polarization beam splitter 96 as P-polarized light is transmitted through the polarization separation surface of the second polarization beam splitter 96 to reach the reflection type liquid crystal display element 91B. Here, the reflection type liquid crystal display element 91R effects black display, so that the R light striking the reflection type liquid crystal display element 91R for R is reflected without undergoing image modulation. Thus, even after being reflected by the reflection type liquid crystal display element 91R for R, the R light remains S-polarized light, so that it is reflected again by the polarization separation surface of the first polarization beam splitter 90, and is transmitted through the incidence side polarization plate 94 to be returned to the light source side and removed from the projection light, resulting in black display. On the other hand, since the reflection type liquid crystal display element 91B for B effects black display, the B light striking the reflection type liquid crystal display element 91B for B is reflected without undergoing image modulation. Thus, even after being reflected by the reflection type liquid crystal element 91B for B, the B light remains P-polarized light, so that it is transmitted again through the polarization separation surface of the first polarization beam splitter 90, and is converted to S-polarized light by the first color selective phase difference plate 95 and transmitted through the incidence side polarization plate 94 to be returned to the light source side and removed from the projection light.

The optical construction of the projection type image display device using a reflection type liquid crystal display element (reflection type liquid crystal panel) is as described above.

Next, the mechanical construction of the lamp cooling portion will be described with reference to FIG. 7.

Figure 7:
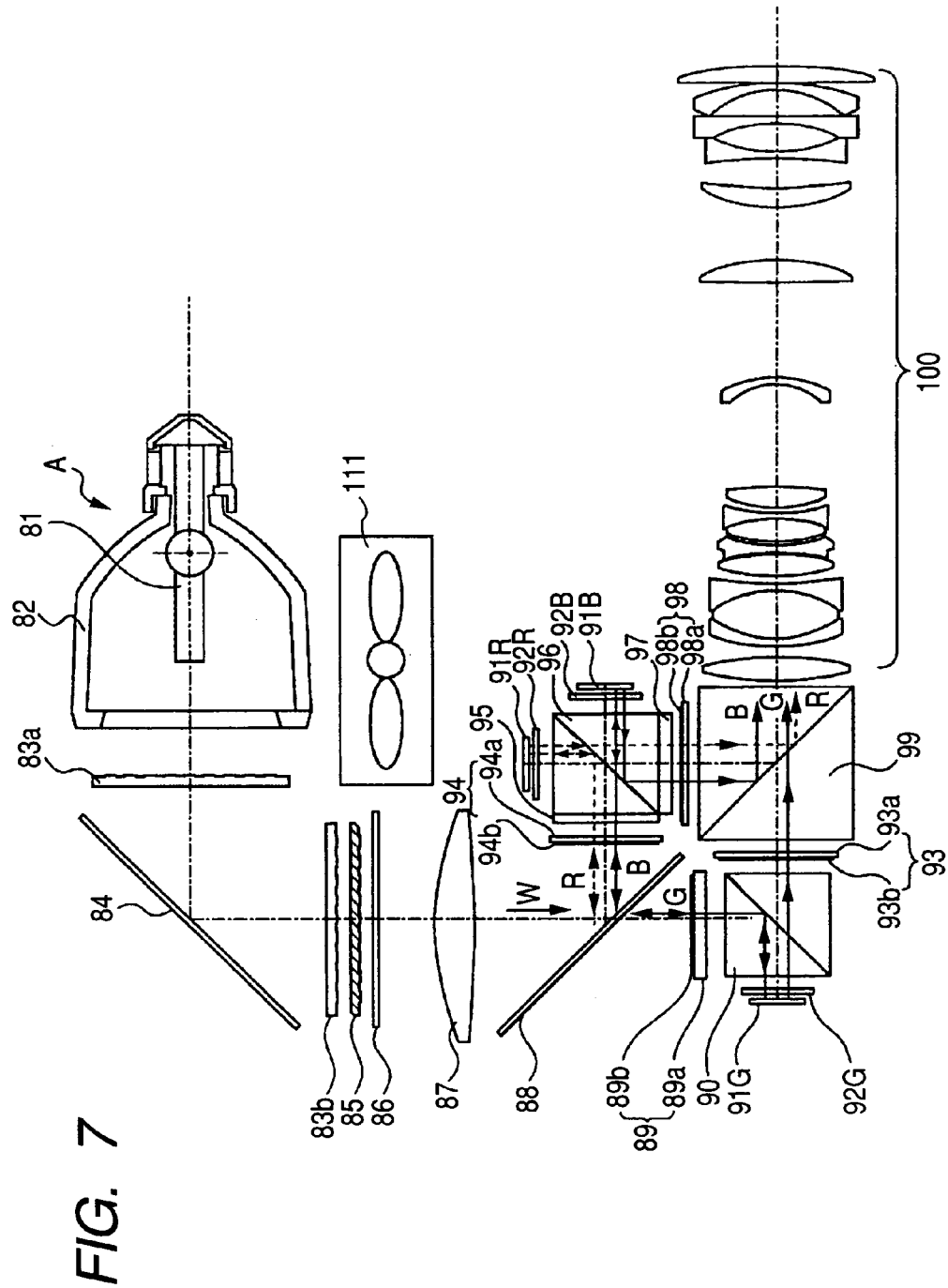
FIG. 7 is a diagram showing the arrangement of a projection display device according to Embodiment 2 of the present invention with a reflection type liquid crystal display element mounted therein.

In FIG. 7, due to the above-described optical construction, the lamp A and the reflection type liquid crystal display element 91R for R and the second polarization beam splitter 96 as the optical means, are arranged close to each other, while the lamp cooling fan 111 cools the lamp A by sending airflow to the lamp A, and is arranged in the gap between the lamp A and the reflection type liquid crystal display element 91R for R and between the lamp A and the second polarization beam splitter 96 at a predetermined interval.

Next, the airflow by the lamp cooling fan 111 will be described.

As can be seen from FIG. 7, as the means for cooling the lamp A, a cooling method utilizing the blowing force of the lamp cooling fan 111 is adopted, so that the air from the lamp cooling fan 111 flows as follows: by rotating the lamp cooling fan 111, there is formed an air flow due to the suction force with respect to the reflection type display element 91R for R and the second polarization beam splitter 96 to cool the reflection type display element 91R for R and the second polarization beam splitter 96, while the air from the lamp cooling fan 111 flows as it is in the direction of the lamp A, and hits the reflector 82, thereby cooling the reflector 82 itself.

In this construction, the lamp cooling fan 111 blows air directly against the reflection type liquid crystal display element 91R for R side surface of the reflector 82 of the lamp A, so that the radiation heat from the lamp on the reflection type liquid crystal display element 91R side surface of the reflector 82 is reduced (The air hits the reflection type liquid crystal display element 91R for R side surface of the reflector 82 as cooling air as it is, so that the temperature distribution on the reflector 82 is such that the temperature on the reflection type liquid crystal display element 91R for R side surface of the reflector 82 is relatively low); thus, the influence of the lamp radiation heat on the reflection type liquid crystal display element 91R for R and the second polarization beam splitter 96 is suppressed as much as possible.

Regarding the influence of the lamp radiation heat, in the case of a polarization beam splitter, when the polarization beam splitter itself generates heat, a temperature distribution is generated in the prism particularly when the volume of the polarization beam splitter itself is large. When this temperature distribution is generated, inner stress is generated in the optical material itself, with the result that there is generated birefringence because of the linear polarization of the incident light becoming elliptical polarization due to the elasticity of light, that is, the relationship between reflection and transmission is disturbed (Due to the generation of an undesired polarization component, the reflection and transmission cease to be effected reliably). As a result, leakage light is allowed to reach the projection surface, which leads to a deterioration in contrast and makes it impossible to obtain a high quality projection type image display device. However, by adopting the arrangement of the lamp cooling fan 111 according to Embodiment 2, it is possible to suppress as much as possible the influence of the lamp radiation heat on the polarization beam splitter 96.

Further, in the case of a reflection type liquid crystal display element, when it is influenced by lamp radiation heat, the reflection type liquid crystal display element itself generates heat. A liquid crystal display element is inherently easily affected by heat, with the result that a deterioration in contrast, color heterogeneity, etc. are generated due to the vaporization of the liquid crystal itself, making it impossible to obtain a high quality projection type image display device. However, by adopting the arrangement of the lamp cooling fan 111 according to Embodiment 2, it is possible to suppress as much as possible the influence of the lamp radiation heat on the reflection type liquid crystal display element 91R.

On the other hand, the air from the lamp cooling fan 111 flows substantially linearly from the reflection type liquid crystal display element 91R for R and the second polarization beam splitter 96 to the lamp A, so that the air can be smoothly discharged to the exterior of the projection type image display device while involving as little resistance as possible, whereby efficient cooling is possible and it is possible to obtain a sufficient cooling capacity even if the fan voltage of the lamp cooling fan 111 is reduced, thereby making it possible to obtain a high quality image display device also superior in noise reduction performance.

Embodiment 3

Next, the mechanical construction of the light source device of a projection type image display device will be described in detail with reference to FIGS. 8 and 9.

Figure 8:
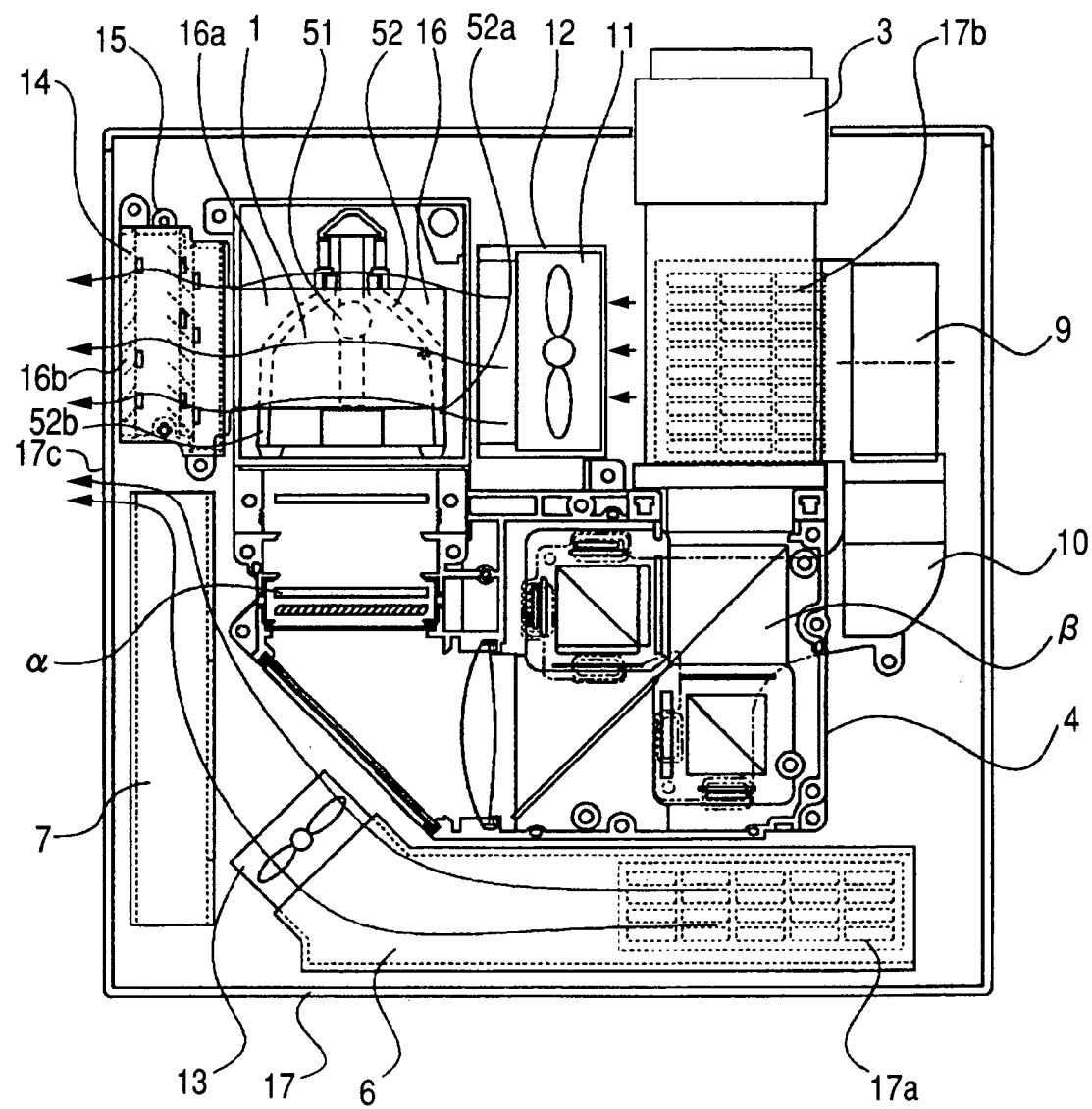
FIG. 8 is a plan view of the mechanical construction of a light source device according to Embodiment 3 of the present invention.
Figure 9:
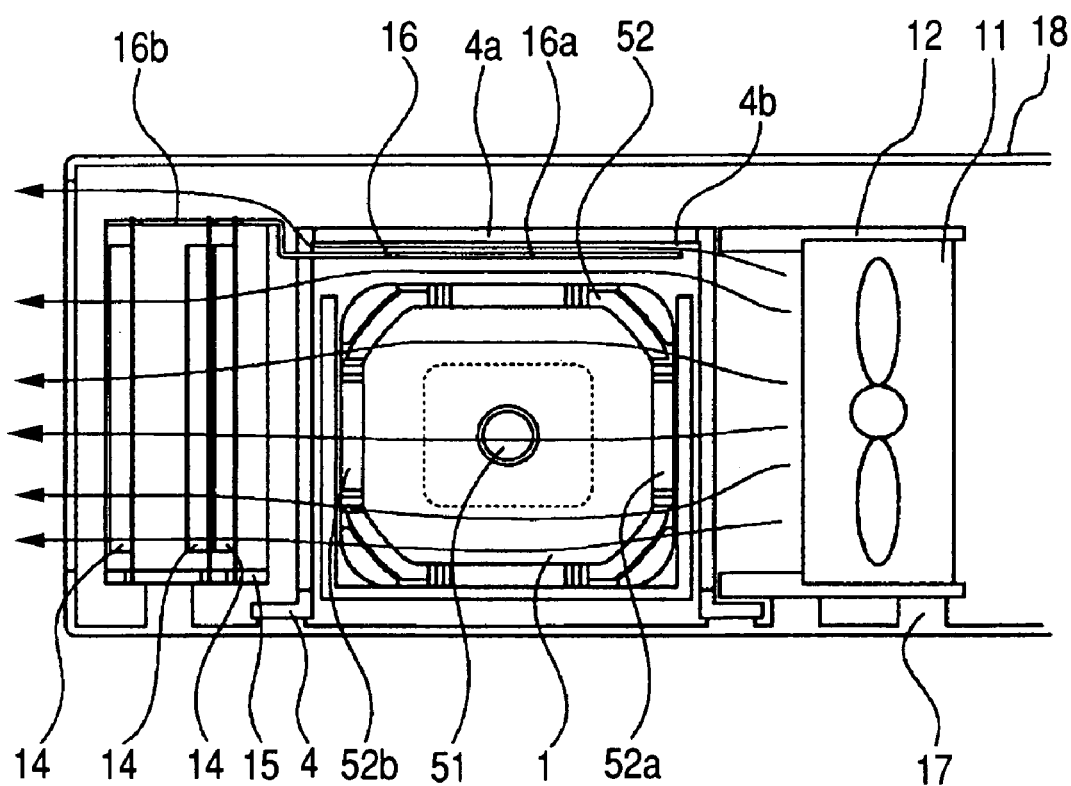
FIG. 9 is a sectional view of the mechanical construction of the light source device according to Embodiment 3 of the present invention.

In FIGS. 8 and 9, in the gap between the lamp 1 and the lamp case member 4a constituting the component around the lamp, there is arranged the heat shield member 16 as described above. As shown in FIG. 8, the construction of the heat shield member 16 is such that it is arranged between the lamp 1 and the lamp case member 4a with a gap so as to cover the lamp reflector 52 two-dimensionally by the main body portion 16a. On the other hand, the heat shield member 16 forms a ventilation passage, through which hot air from the lamp passes, between itself and the extension portion 16b reaching the portion of the ventilation duct 15 in the vicinity of the exhaust louver 14. Further, as shown in FIG. 9, also with respect to the lamp case member 4a, the main body portion 16a of the heat shield member 16 is fixed to the lamp case 4a with a gap therebetween, and this gap between the main body portion 16a and the lamp case member 4a is formed so as to constitute an air guide path 4b into which a portion of the cooling air from the lamp cooling fan 11 flows and passes. The heat shield member 16 is formed of a material having a higher heat conductivity and lower heat radiation rate than the lamp case member 4a, for example, an aluminum plate.

Next, the air flow due to the lamp cooling fan 11 will be described.

As can be seen from FIGS. 8 and 9, as the means for cooling the lamp 1, there is adopted a cooling method utilizing the blowing force of the lamp cooling fan 11. The air from the lamp cooling fan 11 flows as follows: first, by rotating the lamp cooling fan 11, the air from the lamp cooling fan 11 flows as it is in the direction of the lamp 1, and hits the reflector 52. A portion of this air passes through the cutout portion 52a provided in the reflector 52, and hits the light emission tube 51 to thereby cool the light emission tube 51. The purpose of cooling the light emission tube 51 is to maintain the temperature of the light emission tube 51 at a fixed level, and to maintain an appropriate lamp brightness. Then, the air passes through another cutout portion 52b provided in the reflector 52, and is discharged through the exhaust louver 14 to the exterior of the projection type image display device. On the other hand, most of the air hitting the reflector 52 flows around the reflector 52 while cooling the reflector 52 itself until it reaches the exhaust louver 14. Thereafter, the air is discharged to the exterior of the projection type image display device.

However, the radiation heat due to the lamp 1 is greater than is expected, so that heat is likely to fill the portion around the lamp 1. In the case in which the lamp case member 4a is formed of a plastic material, the heat conductivity is low and the heat radiation rate is high; thus, when this heat reaches the lamp case member 4a, it is very difficult to cool the component around the lamp since, once heated to high temperature, the component around the lamp exhibits low heat conductivity. Moreover, also due to the high heat radiation rate, heat is allowed to fill the interior of the device, with the result that the projection type image display device as a whole attains high temperature as can be easily imagined.

In view of this, in the construction of the present invention, the main body portion 16a of the heat shield member 16 covers the reflector 52 two-dimensionally as shown in FIG. 8, making it difficult for the heat to be conducted to the lamp case member 4a. Further, the extension portion 16b of the heat shield member 16 provided in the gap between the lamp 1 and the lamp case member 4a extends so as to enter the ventilation duct 15, whereby the heat filling the portion around the lamp 1 can be quickly discharged to the exterior of the projection type image display device by the two means of the heat conduction of the heat shield member 16 itself and the air flow due to the lamp cooling fan 11.

Further, the gap between the main body portion 16a of the heat shield member 16 and the lamp case member 4a is formed as the air guide path for the lamp cooling fan 11, so that, by the air flowing through this gap, the heat of both the lamp case member 4a and the heat shield member 16 is carried to the exterior of the projection type image display device, which also contributes to a reduction in the quantity of heat filling the interior of the projection type image display device.

As a result, an increase in the temperature of the lamp case member 4a constituting the component around the lamp is suppressed, so that heat does not easily fill the interior of the projection type image display device, whereby there is no deterioration in the cooling efficiency for the other portions requiring cooling. Further, it is also possible to avoid material damage due to the heat of the lamp case member 4a and discomfort due to the heat of the exterior case, making it possible to provide a product satisfactory also in terms of product safety.

Embodiment 4

Next, another mechanical construction of the light source device will be described with reference to FIG. 10.

This embodiment only differs from Embodiment 3 in that the heat shield member 16 (see FIG. 1) is converted to a heat shield member 116. Thus, a description of the other components will be omitted.

Figure 10:
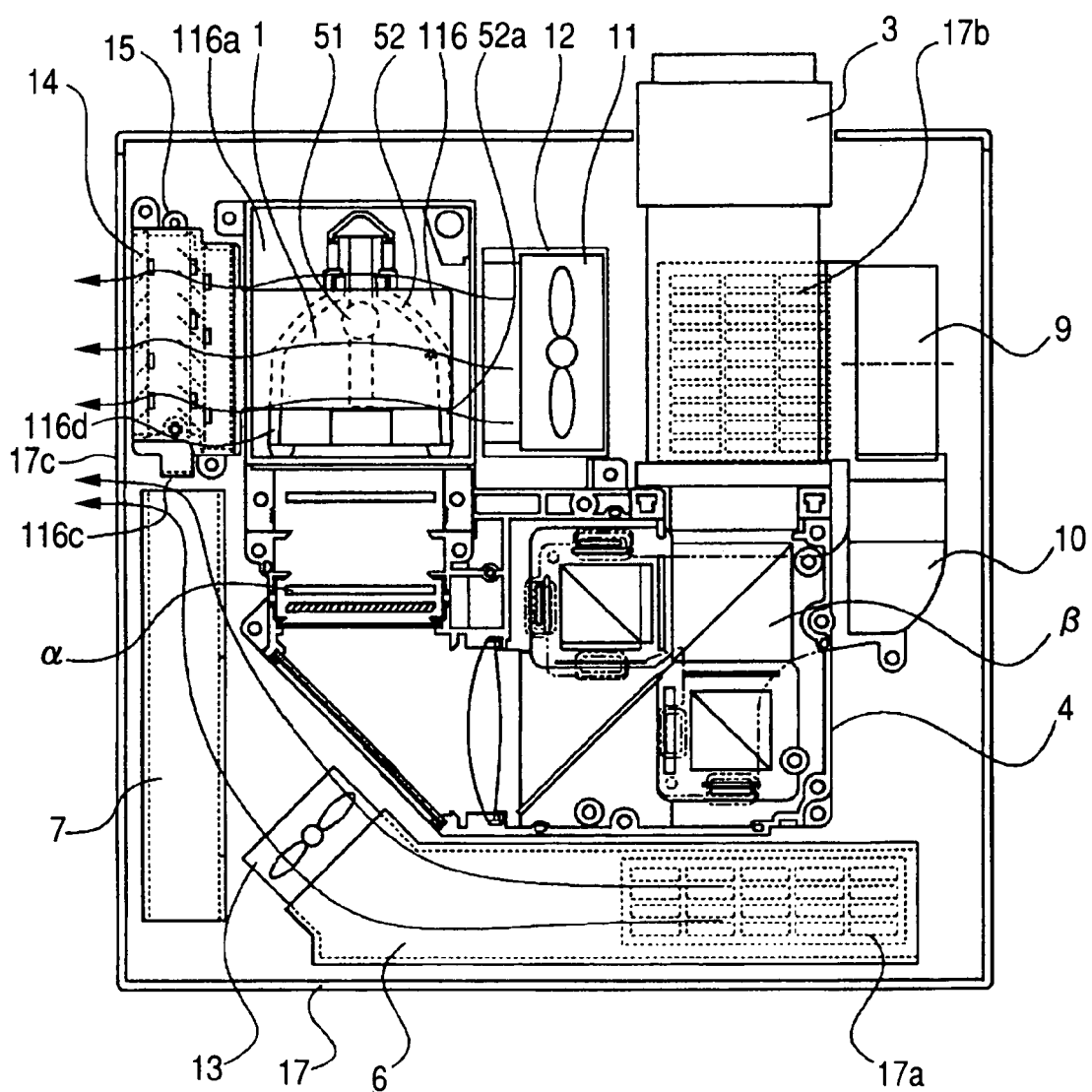
FIG. 10 is a plan view of the mechanical construction of a light source device according to Embodiment 4 of the present invention.

In FIG. 10, reference numeral 116 indicates a heat shield member which has a main body portion 116a arranged in the gap between the lamp 1 and the lamp case member 4a and whose main body portion 116a is fixed to the lamp case 4a with a gap also with respect to the lamp case member 4a. Further, the heat shield member 116 has an extension portion 116b formed so as to cover the ventilation duct 15, with the exhaust louver 14 accommodated in the ventilation duct 15. That is, the extension portion 116b of the heat shield member 116 is formed so as to enter the ventilation duct 15, forming between the ventilation duct 15 and the extension portion 116b an air path through which the hot air from the lamp passes. Further, the heat shield member 116 is formed of a material having a higher heat conductivity and lower heat radiation rate than the lamp case member 4a constituting the component around the lamp, for example, an aluminum plate.

On the other hand, as in Embodiment 3, the power source cooling fan 13 circulates air through the power source 6 by sucking air through the intake port 17b provided in the exterior cabinet 17, and cools the power source 6 and the ballast power source 7 simultaneously by circulating the air due to the blowing force of the ballast power source 7 through the ballast power source 7. After being blown against the ballast power source 7, the air passes through the ballast power source 7, and is discharged to the exterior of the projection type image display device through the exhaust port 17c provided in the exterior cabinet 17. That is, by the power source cooling fan 13, there is formed a flow passage from the intake port 17a to the exhaust port 17c by way of the power source 6 and the ballast power source 7. The exhaust port 17c also serves as an exhaust port through which the cooling air due to the lamp cooling fan is discharged.

An arm portion 116c of the heat shield member 116 extends so as to enter the flow path for the air due to the power source cooling fan 13. The temperature of the air in the flow path for the power source cooling fan 13 is lower than the temperature of the air in the flow path for the lamp cooling fan 11, so that allowing the arm portion 116c of the heat shield member 116 to enter the flow path for the air due to the power source cooling fan 13 results in an air at low temperature being blown against the arm portion 116c, which leads to a promotion of heat conduction of the heat shield member 116, that is, an improvement in the heat absorbing action, heat conducting action, and heat dissipating action, whereby it is possible to further enhance the cooling effect.

Thus, in the construction of Embodiment 4 of the present invention, the reflector 52 is covered two-dimensionally with the main body portion 116a of the heat shield member 116, whereby heat is not easily conducted to the lamp case member 4a. Further, in addition to the construction in which the extension portion 16b of the heat shield member 16 provided in the gap between the lamp 1 and the lamp case member 4a enters the ventilation duct 15, there is adopted a construction in which the arm portion 116c enters the flow path for a fan separate from the lamp cooling fan 11, that is, the power source cooling fan 13, whereby the heat filling the portion around the lamp 1 can be quickly discharged to the exterior of the projection type image display device by the three actions of the promotion of heat conduction of the heat shield member 116 itself, the air flow due to the lamp cooling fan 11, and the air flow due to the power source cooling fan 13.

As in the construction of Embodiment 3, the gap between the main body portion 116a of the heat shield member 116 and the lamp case member 4a is formed as the air guide path for the lamp cooling fan 11, so that, by the air flowing through this gap, the heat of both the lamp case member 4a and the heat shield member 116 is carried to the exterior of the projection type image display device, which also naturally contributes to a reduction in the quantity of heat filling the interior of the projection type image display device.

As a result, an increase in the temperature of the lamp case member 4a constituting the component around the lamp is suppressed, so that heat does not easily fill the interior of the projection type image display device, whereby a deterioration in the cooling efficiency for the other components requiring cooling is not generated. Further, it is possible to prevent material damage due to the heat of the lamp case member 4a and discomfort due to the heat of the exterior case, thus making it possible to provide a product sufficiently satisfactory also in terms of product safety.

While in the above description the heat shield member 116 extends into the exhaust flow passage for the power source cooling fan 13 serving as a fan separate from the lamp cooling fan 11 and adapted to cool at least the ballast power source, it is also possible to use, as the fan separate from the lamp cooling fan 11, the optical fan 9 for cooling the optical system (the illumination optical system, the color separation/composition optical system, etc.).

Embodiment 5

Next, another mechanical construction of the light source device will be described with reference to FIG. 11.

This embodiment only differs from Embodiment 3 in that the heat shield member 16 (see FIG. 1) is converted to a heat shield member 216. Thus, a description of the other components will be omitted.

Figure 11:
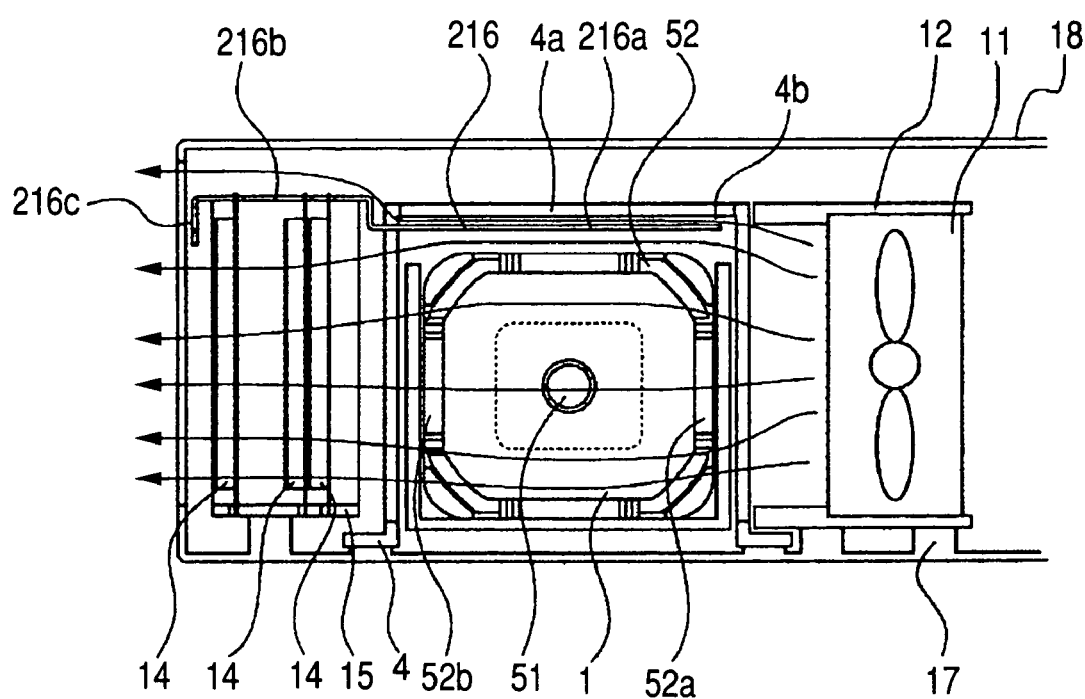
FIG. 11 is a sectional view of the mechanical construction of a light source device according to Embodiment 5 of the present invention.

In FIG. 11, reference numeral 216 indicates a heat shield member which has a main body portion 216a arranged in the gap between the lamp 1 and the lamp case member 4a and whose main body portion 216a is fixed to the lamp case 4a with a gap also with respect to the lamp case member 4a. Further, the heat shield member 216 has an extension portion 216b formed so as to cover the ventilation duct 15, with the exhaust louver 14 accommodated in the ventilation duct 15. That is, the extension portion 216b of the heat shield member 216 is formed so as to enter the ventilation duct 15, forming between the ventilation duct 15 and the extension portion 216b an air path through which the hot air from the lamp passes.

Further, the heat shield member 216 has an arm portion 216c opposed to the exhaust port 17c of the exterior cabinet 17. That is, the heat shield member 216 extends to a position in the vicinity of the outlet of the ventilation duct 15, where it is bent substantially at right angles. The fact that the arm portion 216c is opposed to the exhaust port 17c means that the arm portion 216c is in contact with the ambient air, so that the temperature of the arm portion 216c is low. This leads to a promotion of the heat conduction of the heat shield member 116, that is, an improvement in the heat absorbing action, heat conducting action, and heat dissipating action, thereby making it possible to further enhance the cooling effect.

Further, the heat-shield member 216 is formed of a material, such as an aluminum plate, having a higher heat conductivity and a lower heat radiation rate than the lamp case member 4a constituting the component around the lamp.

Thus, in the construction of Embodiment 5 of the present invention, the reflector 52 is covered two-dimensionally with the main body portion 216a of the heat shield member 216, whereby heat is not easily conducted to the lamp case member 4a. Further, in addition to the construction in which the extension portion 216b of the heat shield member 216 provided in the gap between the lamp 1 and the lamp case member 4a enters the ventilation duct 15, there is adopted a construction in which the arm portion 216c is opposed to the exhaust port 17c of the exterior cabinet 17 of the heat shield member 216, whereby the heat filling the portion around the lamp 1 can be quickly discharged to the exterior of the projection type image display device by the two actions of the promotion of heat conduction of the heat shield member 216 itself, and the air flow due to the lamp cooling fan 11.

As in the construction of Embodiment 3, the gap between the main body portion 216a of the heat shield member 216 and the lamp case member 4a is formed as the air guide path 4b for the lamp cooling fan 11, so that, by the air flowing through this gap, the heat of both the lamp case member 4a and the heat shield member 216 is carried to the exterior of the projection type image display device, which also naturally contributes to a reduction in the quantity of heat filling the interior of the projection type image display device.

As a result, an increase in the temperature-of the lamp case member 4a constituting the component around the lamp is suppressed, so that heat does not easily fill the interior of the projection type image display device, whereby a deterioration in the cooling efficiency for the other components requiring cooling is not generated. Further, it is also possible to prevent material damage due to the heat of the lamp case member 4a and discomfort due to the heat of the exterior case, thus making it possible to provide a product sufficiently satisfactory also in terms of product safety.

While in all of Embodiments 3, 4, and 5 described above the blowing force of a fan is utilized to cool lamp, the present invention is naturally also applicable to a case in which there is used a fan that sucks the air of the lamp portion from the exhaust louver 14 side and discharges hot air to the exterior of the projection type image display device.

By combining the projection type display device equipped with a light source portion as described with reference to Embodiments 1 through 5 with an image signal supply device that supplies an image signal thereto (e.g., a personal computer, a video camera, or a digital camera), it is possible to provide an image projection system suitable for a conference, an explanatory meeting, a presentation meeting, or the like. In this case, the communication between the reflection type liquid crystal image display device and the image signal input device may be effected through a communication cable or by utilizing a wireless LAN system.

According to the present invention, it is possible to provide a projection display device and an image projection system which help to realize efficient light source cooling without involving a deterioration in optical performance.

Further, according to the present invention, it is possible to provide a light source device, a projection display device, and an image projection system in which an increase in the temperature of the light source lamp and of the lamp case is prevented so that no heat may be allowed to fill the device.

As many apparently widely different embodiments of the present invention can be made without departing from the spirit and scope thereof, it is to be understood that the invention is not limited to the specific embodiments thereof except as defined in the claims.

This application claims priority from Japanese Patent Application Nos. 2004-095827 filed Mar. 29, 2004, and 2004-095828 filed Mar. 29, 2004, which are hereby incorporated by reference herein.

What is claimed is:

1. A projection display device which projects an image onto a projection surface by a projection optical system by using light from a light source, comprising:

a cooling fan arranged between the projection optical system and the light source and adapted to supply cooling air from the projection optical system to the light source; and an exterior case having an exhaust port in a vicinity of the light source and covering the projection optical system, the cooling fan, and the light source, wherein the projection optical system, the cooling fan, the light source, and the exhaust port are arranged substantially in a straight line, and wherein the cooling fan supplies the cooling air from the projection optical system to the light source while maintaining a flow direction of the cooling air.

2. A projection display device according to claim 1, wherein the light source includes a light emission tube, a reflector and an opening, and wherein the cooling fan supplies cooling air to the reflector and supplies cooling air also to the light emission tube through the opening.

3. A projection display device according to claim 1, wherein the cooling fan is spaced apart from the projection optical system by a distance of 5 mm to 40 mm.

4. A projection display device according to claim 1, further comprising an exhaust louver arranged between the light source and the exhaust port.

5. A projection display device which projects light emitted from a light source onto a projection surface through a color separation/composition optical system including an image forming element, comprising:
- a cooling fan arranged between the color separation/composition optical system and the light source and adapted to supply cooling air from the color separation/composition optical system to the light source; and
- an exterior case having an exhaust port in a vicinity of the light source and covering the color separation/composition optical system, the cooling fan, and the light source,
- wherein the color separation/composition optical system, the cooling fan, the light source, and the exhaust port are arranged substantially in a straight line, and
- wherein the cooling fan supplies the cooling air from the color separation/composition optical system to the light source while maintaining a flow direction of the cooling air.

6. A projection display device comprising:
- a light source that sends light in a first direction;
- an illumination optical system that emits the light from the light source in a second direction which is substantially perpendicular to the first direction;
- a color separation/composition optical system including an image forming element and adapted to send the light from the illumination optical system in a third direction which is substantially opposite to the first direction;
- a projection optical system that projects the light from the color separation/composition optical system in the third direction;
- a cooling fan arranged between the projection optical system and the light source and adapted to send cooling air from the projection optical system to the light source while maintaining a flow direction of the cooling air; and
- an exterior case having an exhaust port in a vicinity of the light source and covering the projection optical system, the color separation/composition optical system, the illumination optical system, the cooling fan, and the light source,
- wherein the projection optical system, the cooling fan, the light source, and the exhaust port are arranged substantially in a straight line.

7. A projection display device according to claim 6,
- wherein the illumination optical system has a reflection mirror, a first fly-eye lens, and a second fly-eye lens, and
- wherein the reflection mirror is arrange on a side closer to the color separationlcomposition optical system than to the first fly-eye lens and the second fly-eye lens.

8. A projection display device comprising:
- a light source that sends light in a first direction;
- an illumination optical system that emits the light from the light source in a second direction which is substantially perpendicular to the first direction;
- a color separation/composition optical system including an image forming element and adapted to send the light from the illumination optical system in a third direction which is substantially opposite to the first direction;
- a projection optical system that projects the light from the color separation/composition optical system in the third direction;
- a cooling fan arranged between the color separation/composition optical system and the light source and adapted to send cooling air from the color separation/composition optical system to the light source while maintaining a flow direction of the cooling air; and
- an exterior case having an exhaust port in a vicinity of the light source and covering the projection optical system, the color separation/composition optical system, the illumination optical system, the cooling fan, and the light source,
- wherein the color separation/composition optical system, the cooling fan, the light source, and the exhaust port are arranged substantially in a straight line.

9. An image projection system comprising:
- the projection display device as claimed in claim 1; and
- an image signal supply device that supplies an image signal to the projection display device.

* * * * *